(12) United States Patent
Tanaka et al.

(10) Patent No.: US 12,448,345 B2
(45) Date of Patent: Oct. 21, 2025

(54) 1,3-CYCLOHEXANEDIONE DERIVATIVES AND 1,3-CYCLOPENTANEDIONE DERIVATIVES AS BUFFERING MOLECULES IN NON-AQUEOUS SOLUTIONS

(71) Applicant: OKINAWA INSTITUTE OF SCIENCE AND TECHNOLOGY SCHOOL CORPORATION, Okinawa (JP)

(72) Inventors: Fujie Tanaka, Okinawa (JP); Muhammad Sohail, Okinawa (JP)

(73) Assignee: Okinawa Institute of Science and Technology School Corporation, Okinawa (JP)

(*) Notice: Subject to any disclaimer, the term of this patent is extended or adjusted under 35 U.S.C. 154(b) by 690 days.

(21) Appl. No.: 17/769,124

(22) PCT Filed: Oct. 15, 2020

(86) PCT No.: PCT/JP2020/038871
§ 371 (c)(1),
(2) Date: Apr. 14, 2022

(87) PCT Pub. No.: WO2021/075482
PCT Pub. Date: Apr. 22, 2021

(65) Prior Publication Data
US 2024/0132435 A1  Apr. 25, 2024

Related U.S. Application Data

(60) Provisional application No. 62/915,824, filed on Oct. 16, 2019.

(51) Int. Cl.
*C07C 49/657* (2006.01)
*C07C 49/603* (2006.01)
*C07C 49/613* (2006.01)
*C07D 209/34* (2006.01)
*C09K 15/06* (2006.01)

(52) U.S. Cl.
CPC .......... *C07C 49/657* (2013.01); *C07C 49/603* (2013.01); *C07C 49/613* (2013.01); *C07D 209/34* (2013.01); *C09K 15/06* (2013.01); *C07C 2601/14* (2017.05)

(58) Field of Classification Search
None
See application file for complete search history.

(56) References Cited

FOREIGN PATENT DOCUMENTS

JP  63-139147 A  6/1988
JP  63-139417 A  6/1988

OTHER PUBLICATIONS

Fraley, M. et al. "Two Methods for the Preparation of 2-Cyclohexanones from resin-bound 1,3-cyclohexanedione" Tetrahedron Letters, vol. 38, No. 19, pp. 3365-3368, 1997) (Year: 1997).*
Devos, D. E. et al. "Epoxidation of Terminal or Electron-deficient Olefins with H2O2, catalysed by Mntrimethyltriazacyclonane Complexes in the Presence of an Oxalate Buffer" Tetrahedron Letters 39 (1998) 3221-3224 (Year: 1998).*
International Preliminary Report on Patentability of Chapter I, i.e., International Search Opinion issued in International application No. PCT/JP2020/038871, dated Dec. 22, 2022.
International Search Report and Search Opinion issued in International application No. PCT/JP2020/038871 dated Dec. 22, 2022.
Chouthaiwale et al., Catalytic enatioselective formal (4+2) cycloaddition by aldol-aldol annulation of pyruvate derivatives with cyclohexane-1,3-diones to afford funcitionalized decalins, Angew. Chem. Int. Ed., 2018, vol. 57, Issue 40, p. 13298-13301.
Kutt et al., pKa values in organic chemistry—Making maximum use of the available data, Tetrahedron Letters, 2018, vol. 59, Issue 42, p. 3738-3748.
Sohail et al., Control of chemical reactions by using molecules that buffer non-aqueous solutions, Chem. Eur. J., 2019, vol. 26, Issue 1, p. 222-229.
V. S. Stoll, J. S. Blanchard, Buffers: Principles and Practice, Methods Enzymol. 2009, 463, 43.
R. K. Schmidt, K. Muther, C. Muck-Lichtenfeld, S. Grimme, M. Oestreich, Silylium ion-catalyzed challenging diels ader reactions: the danger of hidden proton catalysis with Strong Lewis acids, J. Am. Chem. Soc. 2012, 134, 4421.
M. J. R. Richter, M. Schneider, M. Brandstatter, S. Krautwald, E. M. Carreira, Total synthesis of (-)-mitrephorone A, , J. Am. Chem. Soc. 2018, 140, 16704.
Office Action dated Dec. 10, 2024 issued in the corresponding Japanese patent application No. 2022-521961 with its English Machine Translation.

* cited by examiner

*Primary Examiner* — Medhanit W Bahta
(74) *Attorney, Agent, or Firm* — Troutman Pepper Locke LLP

(57) ABSTRACT

This invention relates to 1,3-cyclohexanedione derivatives and 1,3-cyclopentanedione derivatives that have buffering function in non-aqueous solutions and to the use thereof for tuning the conditions to control chemical events in non-aqueous solutions. One aspect of the invention is a method for buffering a non-aqueous solution, including adding a buffering molecule to the non-aqueous solution, in which the non-aqueous solution contains an organic solvent, the buffering molecule is a 1,3-cyclohexanedione derivative or a 1,3-cyclopentanedione derivative, and the buffering molecule is optionally conjugated to a solid support.

10 Claims, 6 Drawing Sheets

1,3-CYCLOHEXANEDIONE DERIVATIVES AND 1,3-CYCLOPENTANEDIONE DERIVATIVES AS BUFFERING MOLECULES IN NON-AQUEOUS SOLUTIONS

TECHNICAL FIELD

This invention relates to 1,3-cyclohexanedione derivatives and 1,3-cyclopentanedione derivatives that have buffering function in non-aqueous solutions, and to the use of buffering functions of these molecules in non-aqueous solutions for tuning the conditions to control chemical events.

BACKGROUND ART

To control chemical reactions in aqueous solutions or to maintain conditions suitable for enzyme-catalyzed reactions and for storage of biological samples such as enzymes and antibodies, the use of buffers is a common practice (V. S. Stoll, J. S. Blanchard, Methods Enzymol. 2009, 463, 43).

However, no molecules that have buffering functions in non-aqueous solutions to maintain conditions suitable for chemical reactions were commonly used. Scavengers have been employed to remove certain molecules in non-aqueous solutions to maintain the desired conditions (R. K. Schmidt, K. Muther, C. Muck-Lichtenfeld, S. Grimme, M. Oestreich, J. Am. Chem. Soc. 2012, 134, 4421; M. J. R. Richter, M. Schneider, M. Brandstatter, S. Krautwald, E. M. Carreira, J. Am. Chem. Soc. 2018, 140, 16704). Common scavenger molecules, however, do not have buffering functions; scavengers that remove acids cannot be used to remove bases and vice versa.

SUMMARY OF INVENTION

This invention relates to a 1,3-cyclohexanedione derivative or a 1,3-cyclopentanedione derivative that has a buffering function in a non-aqueous solution. They are optionally conjugated to a solid support.

One aspect of the invention is a method for buffering a non-aqueous solution, including adding a buffering molecule to the non-aqueous solution, in which the non-aqueous solution contains an organic solvent, the buffering molecule is a 1,3-cyclohexanedione derivative or a 1,3-cyclopentanedione derivative, and the buffering molecule is optionally conjugated to a solid support.

In certain embodiments, the 1,3-cyclohexanedione derivative has a structure represented by Formula I:

[Chem.1]

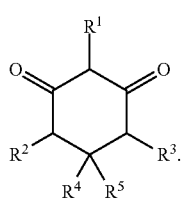

In Formula I of such embodiments, $R^1$ to $R^5$ each may be hydrogen or a substituent, and any two groups of $R^1$ to $R^5$ optionally form a ring.

In certain embodiments, the 1,3-cyclopentanedione derivative has a structure represented by Formula II:

[Chem.2]

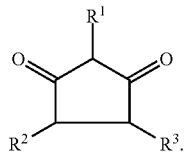

In Formula II of such embodiments, $R^1$ to $R^3$ each may be hydrogen or a substituent, and any two groups of $R^1$ to $R^3$ optionally form a ring.

In certain embodiments, the substituent is alkyl, cycloalkyl, aryl, heterocycloalkyl, heteroaryl, or acyl, which is optionally substituted with one or more substituents selected from the group consisting of alkyl, alkenyl, alkynyl, alkoxy, nitro, cyano, halogen, hydroxy, acyl, carboxyl, carboxyamide, carboxylic acid ester, haloalkyl, halo-alkoxy, aryl, heterocycloalkyl, and heteroaryl.

In certain embodiments, the buffering molecule is conjugated to the solid support. The solid support may be a particle, a container, or a device.

In certain embodiments, the organic solvent is selected from the group consisting of aliphatic compounds, aromatic compounds, alcohols, esters, ethers, ketones, nitriles, and halogenated hydrocarbons.

In certain embodiments, the method further includes storing a chemical compound in the non-aqueous solution. In such embodiments, an acid or a base may be capable of causing an isomerization, a racemization, or a decomposition of the chemical compound, and the buffering molecule suppresses the isomerization, the racemization, or the decomposition.

In certain embodiments, the method further includes adding at least one reactant to the non-aqueous solution; and carrying out a chemical reaction involving the reactant. In such embodiments, the chemical reaction can produce a product that is different from a product of the reaction carried out without the buffering molecule.

Other aspect of the invention is a method for controlling structural change of a compound in a non-aqueous solution, wherein an acid or a base is capable of causing structural change of the compound, and the method comprises preparing a non-aqueous solution comprising the compound and a buffering molecule represented by Formula I or II. The method includes a method for suppressing the structural change of the compound in the non-aqueous solution and a method for converting the compound to a product having another structure. The latter method includes converting the compound having another structure by reacting two or more molecules of the compound with each other or by reacting the compound with an organic solvent.

According to another aspect of the invention, a non-aqueous solution contains a buffering molecule, in which the buffering molecule is a 1,3-cyclohexanedione derivative or a 1,3-cyclopentanedione derivative, and the buffering molecule is optionally conjugated to a solid support. The non-aqueous solution may contain a compound in which an acid or a base is capable of causing structural change of the compound.

Another aspect of the invention is an article containing a solid support and a buffering molecule conjugated to the solid support, in which the buffering molecule is a 1,3-cyclohexanedione derivative or a 1,3-cyclopentanedione derivative.

Advantageous Effects of Invention

To prevent the decomposition, isomerization, and racemization, usually the cause (i.e., acid or base or which type of acid or base) should be understood and the action should be different depending on the cause. With the use of the buffering molecule, there is no need to consider whether the decomposition, isomerization, and/or racemization is caused by a base or an acid or which type of base or acid is causing the decomposition, isomerization, and/or racemization. For example, simple addition of the buffering molecule or its solid support-conjugated version in storage solutions of molecules of interest can prevent decomposition, isomerization, and/or racemization caused by both acids and bases. Further, simple addition of the buffering molecule or its solid support-conjugated version in chemical reaction mixtures can also alter the reaction products.

DESCRIPTION OF EMBODIMENTS

Figure 1:
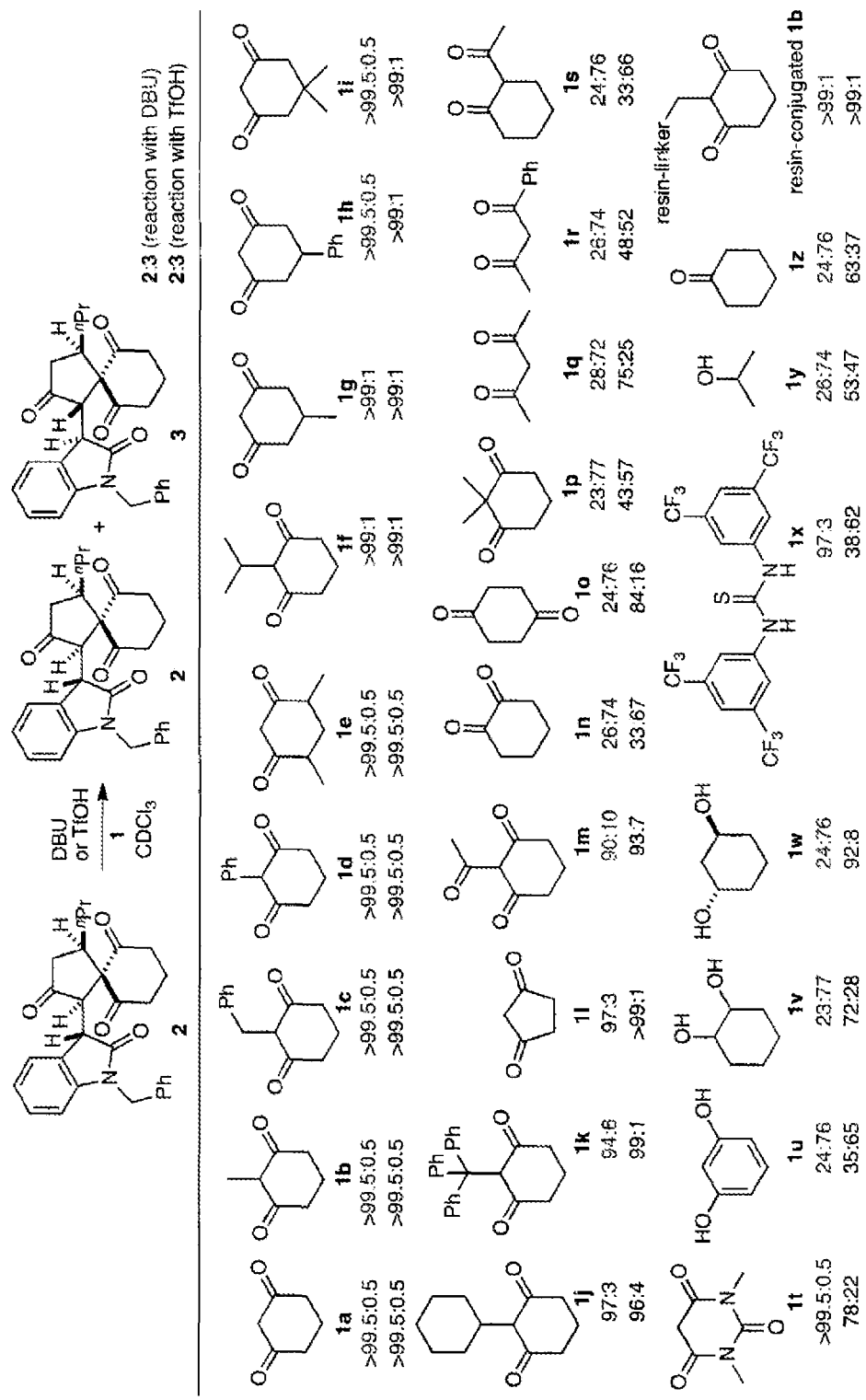
FIG. 1 illustrates 1,3-cyclohexanedione derivatives, 1,3-cyclopentanedione, and related compounds 1a through 1z, and resin conjugated 1b, and there their effects in the 1,8-diazabicyclo[5.4.0]undec-7-ene (DBU)-catalyzed and trifluoromethanesulfonic acid (TfOH)-catalyzed isomerization of compound 2 to 3.

Certain embodiments of the present invention are described below. Although the embodiments of the present invention have been described herein, the description is merely illustrative. Further modification of the invention herein disclosed will occur to those skilled in the respective arts and all such modifications are deemed to be within the scope of the invention as defined by the appended claims. The documents cited herein are incorporated by reference into the specification as supporting references.

The following are definitions of terms used herein.

"Alkyl" by itself or as part of another substituent refers to a saturated hydrocarbon group. "Alkyl" may be a linear or branched group having the number of carbon atoms when it is designated (i.e., $C_{1-8}$ means one to eight carbon atoms). "Cycloalkyl" is an alkyl group that is cyclic. Examples of alkyl groups include methyl, ethyl, n-propyl, isopropyl, n-butyl, t-butyl, isobutyl, and sec-butyl, etc. Examples of cycloalkyl groups include cyclohexyl, cyclopentyl, (cyclohexyl)methyl, cyclopropylmethyl, bicyclo[2.2.1]heptane, bicyclo[2.2.2]octane, etc. Alkyl groups can be substituted or unsubstituted, unless otherwise indicated. Examples of substituted alkyl include haloalkyl, perhaloalkyls, thioalkyl, aminoalkyl, and the like. In some embodiments, the alkyl may be intervened by or linked to oxygen, sulfur, or nitrogen.

"Aryl" refers to an aromatic hydrocarbon group having a single ring (monocyclic) or multiple rings (bicyclic, etc.), which can be fused together or linked covalently. Aryl groups with 6-10 carbon atoms are preferred, where this number of carbon atoms can be designated by $C_{6-10}$, for example. Examples of aryl groups include phenyl and naphthalene-1-yl, naphthalene-2-yl, biphenyl and the like. Aryl groups can be substituted or unsubstituted, unless otherwise indicated.

"Heterocycloalkyl" refers to a saturated or unsaturated non-aromatic ring containing at least one heteroatom (typically 1 to 5 heteroatoms) selected from nitrogen, oxygen, sulfur or silicon. The heterocyclyl ring may be monocyclic or bicyclic. Preferably, these groups contain 0-5 nitrogen atoms, 0-2 sulfur atoms and 0-2 oxygen atoms. More preferably, these groups contain 0-3 nitrogen atoms, 0-1 sulfur atoms and 0-1 oxygen atoms. Examples of heterocycloalkyl groups include pyrrolidine, piperidine, imidazolidine, pyrazolidine, butyrolactam, valerolactam, imidazolidinone, hydantoin, dioxolane, phthalimide, piperidine, 1,4-dioxane, morpholine, thiomorpholine, thiomorpholine-S-oxide, thiomorpholine-S,S-dioxide, piperazine, pyran, pyridone, 3-pyrroline, thiopyran, pyrone, tetrahydrofuran, tetrahydrothiophene, quinuclidine and the like.

"Heteroaryl" refers to an aromatic group containing at least one heteroatom, where the heteroaryl group may be monocyclic or bicyclic. Examples include pyridyl, pyridazinyl, pyrazinyl, pyrimidinyl, triazinyl, quinolinyl, quinoxalinyl, quinazolinyl, cinnolinyl, phthalazinyl, benzotriazinyl, purinyl, benzimidazolyl, benzopyrazolyl, benzotriazolyl, benzisoxazolyl, isobenzofuryl, isoindolyl, indolizinyl, benzotriazinyl, thienopyridinyl, thienopyrimidinyl, pyrazolopyrimidinyl, imidazopyridines, benzothiazolyl, benzofuranyl, benzothienyl, indolyl, quinolyl, isoquinolyl, isothiazolyl, pyrazolyl, indazolyl, pteridinyl, imidazolyl, triazolyl, tetrazolyl, oxazolyl, isoxazolyl, oxadiazolyl, thiadiazolyl, pyrrolyl, thiazolyl, furyl or thienyl.

One aspect of the invention is a method for buffering a non-aqueous solution, including adding a buffering molecule to the non-aqueous solution, in which the non-aqueous solution contains an organic solvent, the buffering molecule is a 1,3-cyclohexanedione derivative or a 1,3-cyclopentanedione derivative, and the buffering molecule is optionally conjugated to a solid support.

In certain embodiments, the 1,3-cyclohexanedione derivative has a structure represented by Formula I:

[Chem.3]

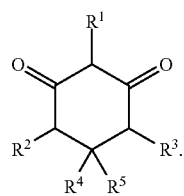

In Formula I of such embodiments, $R^1$ to $R^5$ each may be hydrogen or a substituent, and any two groups of $R^1$ to $R^5$ optionally form a ring. The substituent is optionally conjugated to a solid support such as resin beads.

In certain embodiments, the 1,3-cyclopentanedione derivative has a structure represented by Formula II:

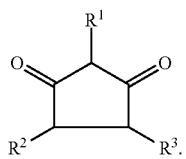
[Chem.4]

In Formula II of such embodiments, $R^1$ to $R^3$ each may be hydrogen or a substituent, and any two groups of $R^1$ to $R^3$ optionally form a ring. The substituent is optionally conjugated to a solid support such as resin beads.

In certain embodiments, the substituent is alkyl, cycloalkyl, aryl, heterocycloalkyl, heteroaryl, or acyl, which is optionally substituted with one or more substituents selected from the group consisting of alkyl, alkenyl, alkynyl, alkoxy, nitro, cyano, halogen, hydroxy, acyl, carboxyl, carboxyamide, carboxylic acid ester, haloalkyl, haloalkoxy, aryl, heterocycloalkyl, and heteroaryl. In some embodiments, the above substituent may be unsubstituted.

Particularly, substituents $R^1$-$R^5$ in Formula I and substituents $R^1$-$R^3$ in Formula II each may be $C_{1-18}$ alkyl, $C_{3-18}$ cycloalkyl, aryl, $C_{3-18}$ heterocycloalkyl, or heteroaryl, which is optionally substituted with one or more substituents selected from the group consisting of $C_{1-18}$ alkyl, $C_{2-18}$ alkenyl, $C_{2-18}$ alkynyl, $C_{1-18}$ alkoxy, nitro, cyano, halogen, hydroxy, carboxy, carboxyamide, carboxylic acid ester, haloalkyl, halo-$C_{1-18}$-alkoxy, aryl, $C_{3-18}$-heterocycloalkyl, and/or heteroaryl.

In some embodiments, the alkyl may be $C_{1-5}$, $C_{1-8}$, or $C_{1-10}$ alkyl, the cycloalkyl may be $C_{3-6}$, $C_{3-8}$, or $C_{3-10}$ cycloalkyl, the heterocycloalkyl may be $C_{3-8}$, $C_{3-10}$, or $C_{3-12}$ heterocycloalkyl, the aryl may be $C_{6-8}$, $C_{6-10}$, or $C_{6-12}$ aryl, and the heteroaryl may be $C_{5-8}$, $C_{5-10}$, or $C_{5-12}$ heteroaryl.

Preferably, the buffering molecule is selected from the group consisting of:

[Chem.5]

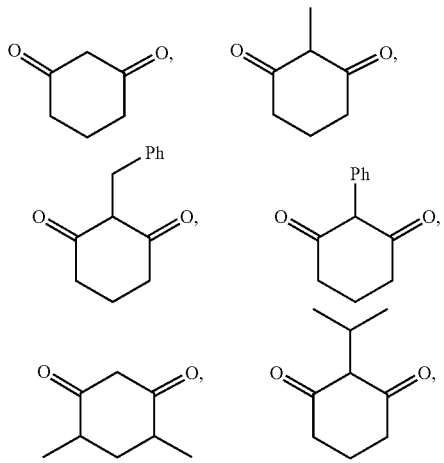

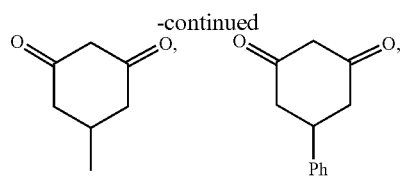

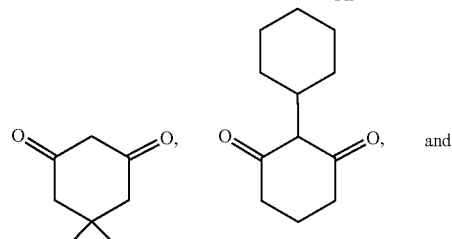

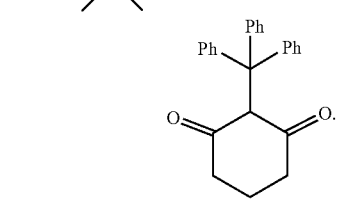

In certain embodiments, the buffering molecule is conjugated to the solid support.

When the solid support is linked to the 1,3-cyclohexanedione derivative having the structure represented by Formula I, the position to which the solid support is liked may be any one of $R^1$ through $R^5$. For example, the solid support is linked to $R^1$ as exemplified below:

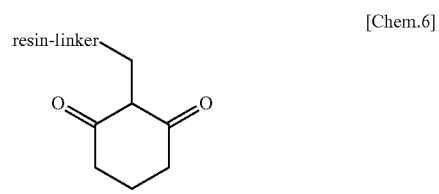
[Chem.6]

When the solid support is linked to the 1,3-cyclopentanedione derivative having the structure represented by Formula II, the position to which the solid support is liked may be any one of $R^1$ through $R^3$.

The link between the solid support and the buffering molecule may be a covalent bond. The solid support may be made from any suitable materials known in the art. For example, the solid support may be made from a resin such as a silicone resin, a polystyrene resin, an acrylic resin.

The solid support can be linked to the buffering molecule directly or via a linker. The linker may be connected to any one of $R^1$ through $R^5$ in Formula I and any one of $R^1$ through $R^3$ in Formula II above. In certain embodiments, at least one of substituents $R^1$ through $R^5$ in Formula I may be the linker. In certain embodiments, at least one of substituents $R^1$ through $R^3$ in Formula II may be the linker. The linker may be any suitable linker known in the art. The linker may be as simple as a covalent bond (e.g., a carbon-carbon bond, disulfide bond, carbon-heteroatom bond, ether, amide, ester, bonds formed by click chemistry (C—C triple bond with azide, etc.) etc.), or it may be more complicated such as a polymeric linker (e.g., polyethylene, polyethylene glycol, polyamide, polyester, etc.) or rings formed by click chemistry (C—C triple bond with azide, etc.), by Diels-Alder reactions, hetro-Diels-Alder reactions, and by cascade reactions (aldol-aldol, aldol-Michael, aldol-Henry, and other reactions). For example, alkenyl resins, amine functionalized resins, benzhydrylamine (BHA) resins, Br-functionalized resins, chloromethyl resins, CHO-functionalized resins, Cl-functionalized resins, F-functionalized resins, $CO_2H$ functionalized resins, etc. may be linked to the buffer molecule. In one embodiment, 4-benzyloxybenzaldehyde resin may be linked to the buffering molecule.

The solid support may be a particle, a container, or a device. In one embodiment, the buffering molecule may be conjugated to an inner wall of a container to which a non-aqueous solution is added. In another embodiment, the buffering molecule is conjugated to particles, and such particles may be suspended in a non-aqueous solution. Alternatively, the buffering molecule may be conjugated to the surface of a device to be used in a non-aqueous solution.

The solid support may be made in a conventional manner using conventional compounds. Also, the solid support may be available from commercial sources. The solid support may be conjugated to the buffering molecule by a method known in the art.

The organic solvent may be appropriately selected depending on the requirements and purpose by a person skilled in the art from any organic solvents known in the art. Suitably, the organic solvent is not acidic or basic. In certain embodiments, the organic solvent is selected from the group consisting of aliphatic compounds, aromatic compounds, alcohols, esters, ethers, ketones, nitriles, and halogenated hydrocarbons. For example, the organic solvent is selected from the group consisting of hexane, octane, cyclohexane, pentane, benzene, toluene, xylene, methanol, ethanol, propanol, butanol, 1,4-dioxane, tetrahydrofuran, butyl methyl ether, diethyl ether, dibutyl ether, acetone, 2-butanone, 3-pentanone, ethyl acetate, acetonitrile dichloromethane, chloroform, mono-, di-, tri-, and multi-halogenated benzene, trifluoromethylbenzene, 1,1,2,2-tetrachloroethane, $CDCl_3$, toluene-$d_8$, $CD_3CN$, acetone-$d_6$, THF-$d_8$, $CD_3OD$, furan, thiophen, and benzofuran. The non-aqueous solution may contain two or more organic solvents.

The non-aqueous solution may contain trace amounts of water as an impurity. In certain embodiments, the non-aqueous solution does not or substantially not contain water. The non-aqueous solution may contain water molecule as a cogenerating product or intermediate of chemical reactions.

In certain embodiments, the method further includes storing a chemical compound in the non-aqueous solution containing the buffering molecule. In such embodiments, an acid or a base may be capable of causing an isomerization, a racemization, or a decomposition of the chemical compound, and the buffering molecule can suppress the isomerization, the racemization, or the decomposition. In this embodiment, even if the non-aqueous solution contains an acid or a base, preferably only 1% or less, more preferably only 0.5% or less, and most preferably 0% of the stored compound is isomerized, racemized, or decomposed by an acid or a base. In the non-aqueous solution containing the buffering molecule, the progress of decomposition, racemization, or isomerization of the chemical compound that occurs in the presence of an acid or a base and in the absence of the buffering molecule may be reduced to at most 30%, at most 20%, at most 10%, at most 5%, at most 1%, at most 0.5%, and preferably 0%.

With the buffering molecule, a chemical compound may be stored for a certain time without being isomerized, racemized, or decomposed by an acid or a base. Accordingly, a method for storing a chemical compound in the non-aqueous solution containing the buffering molecule may be carried out. A chemical compound to be stored may be added to the non-aqueous solution containing the buffering molecule.

To suppress decomposition, isomerization, and racemization of the chemical compound by the buffering molecule, there is no need to consider whether the decomposition, isomerization, and/or racemization is caused by a base or an acid or which type of base or acid is causing the decomposition, isomerization, and/or racemization.

The chemical compound to be stored may be any compound known in the art. For example, the chemical compound to be stored is one from alcohols, aldols, aldehydes, ketones, esters, amides, N-protected-amino aldehydes, Mannich reaction product, N-protected amino acids, N-protected amino acid esters, N-protected peptides, N-protected amino acid derivatives, (β-hydroxy α-amino acid derivatives, and functionalized N-protected amino acid derivatives.

In one embodiment, the compound to be stored is the organic solvent. In this embodiment, the buffering molecule can suppress isomerization, racemization, or decomposition of the solvent.

The chemical compound may be stored in the non-aqueous solution for any length of time. For example, the chemical compound may be stored for at least 10 minutes, 1 hour, 6 hours, 12 hours, 72 hours, or 1 month, or 1 year. The compound may be stored for days or months or years or some decades. A temperature for storing the compound may be appropriately selected depending on the requirements and purpose by a person skilled in the art. For example, the temperature is minus one hundred degrees Celsius (−100° C.) to seventy degrees Celsius (70° C.) such as a room temperature or a higher temperature such as 60° C.

The chemical compound to be stored may be contained at any suitable amount or as suspension in the non-aqueous solution. For example, an amount of the chemical compound to be stored may be $1.0\times10^{-6}$ M to 10 M, such as $1.0\times10^{-6}$ M, $1.0\times10^{-5}$ M, $1.0\times10^{-4}$ M, $1.0\times10^{-3}$ M, $1.0\times10^{-2}$ M, $1.0\times10^{-1}$ M, 0.5 M, 1.0 M, 2.0 M, and 10 M.

The buffering molecule can have a function of suppressing decomposition, isomerization, or racemization of a chemical compound to be stored for various acids and bases. The acid may be any organic or inorganic acid. The acid can cause decomposition, isomerization, or racemization of a certain compound in an organic solvent. For example, the organic acid may be a carboxylic acid or a sulfonic acid, and the inorganic acid may be hydrochloric acid, nitric acid, phosphoric acid, sulfuric acid, or boric acid. In particular, the acid may be trifluoromethanesulfonic acid, $CH_3COOH$, phosphoric acid, $CH_3SO_3H$, p-toluenesulfonic acid, or sulfuric acid. The base may be any organic or inorganic base. The base can cause isomerization, racemization, or decomposition of a certain compound in an organic solvent. For example, the base may be alkoxides, amines, amidines, or nitrogen-containing heterocyclic compounds. Particularly, the base may be 1,8-diazabicyclo[5.4.0]undec-7-ene, $Et_3N$, i-$Pr_2NEt$, quinidine, NaOMe, KO$^t$Bu, or 1,1,3,3-tetramethylguanidine.

In certain embodiments, the method further includes adding at least one reactant to the non-aqueous solution; and carrying out a chemical reaction (or chemical transformation) involving the reactant. For example, two or more reactants may be added to the non-aqueous solution. In such embodiments, the chemical reaction can produce a product that is different from a product of the same reaction carried out without the buffering molecule.

The chemical reaction carried out in this method may be appropriately selected by a skilled person from any chemical reactions to be carried out in an organic solvent. In some embodiments, the chemical reaction is conducted in the presence of an acid or a base. For example, the reaction is an acid-catalyzed or base-catalyzed reaction.

Where the above-described chemical reaction is carried out, the non-aqueous solution may contain an acid or base. The acid may be any organic or inorganic acid. For example, the organic acid may be a carboxylic acid or a sulfonic acid, and the inorganic acid may be hydrochloric acid, nitric acid, phosphoric acid, sulfuric acid, or boric acid. In particular, the acid may be trifluoromethanesulfonic acid, $CH_3COOH$, phosphoric acid, $CH_3SO_3H$, p-toluenesulfonic acid, or sulfuric acid. The base may be any organic or inorganic base. For example, the base may be alkoxides, amines, amidines, or nitrogen-containing heterocyclic compounds. Particularly, the base may be 1,8-diazabicyclo[5.4.0]undec-7-ene, $Et_3N$, i-$Pr_2NEt$, quinidine, NaOMe, KO$^t$Bu, or 1,1,3,3-tetramethylguanidine.

As shown in the Examples, simply adding the buffering molecule to reaction mixtures can completely alter the pathways of the reactions. Preferably, the buffering molecule does not react with the reactant(s) to form the reaction product(s) derived from the buffering molecule and the reactant(s). In other words, the buffering molecule does not form a part of a reaction product. For example, the chemical reaction may be a protection reaction, a deprotection reaction, bond-forming reactions (such as aldol, Michael, and Mannich reactions), an addition reaction, an elimination reaction, a substitution reaction, an organic redox reaction, or a rearrangement reaction. In the chemical composition, the acid or the base may be contained at any suitable amount.

The non-aqueous solution may contain the buffering molecule at any suitable amount. For example, when the non-aqueous solution contains a chemical compound to be stored or a reactant, an amount of the buffering molecule may be at least 0.01, 0.05, 0.1, 0.2, 0.3, 0.4, 0.5, 0.8, 1.0, 2.0, or 3.0 molar equivalent relative to the chemical compound or the reactant. An amount of the buffering molecule may be, for example, 0.01 to 4.0 molar equivalent, 0.1 to 3.0 molar equivalent, or 0.5 to 2.0 molar equivalent. The buffering molecule can be added to the non-aqueous solution in a conventional manner using a conventional equipment at room temperature and pressure. When the reactant is subject to the chemical reaction, the acid or the base may be contained at any suitable amount. For example, an amount of the acid or the base may be 0.01 to 5.0 molar equivalent to the reactant such as 0.05, 0.1, 0.2, 0.3, 0.4, 0.5, 0.8, or 1.0 molar equivalent relative to the reactant.

According to another aspect of the invention, a non-aqueous solution contains an organic solvent and a buffering molecule, in which the buffering molecule is a 1,3-cyclohexanedione derivative or a 1,3-cyclopentanedione derivative, and the buffering molecule is optionally conjugated to a solid support. The organic solvent, the buffering molecule, and the solid support may be selected from those described above. This solution may be used for storing a chemical compound therein or controlling a chemical transformation therein as described above.

According to another aspect of the invention, an article for buffering a non-aqueous solution contains a solid support and a buffering molecule conjugated to the solid support, in which the buffering molecule is a 1,3-cyclohexanedione derivative or a 1,3-cyclopentanedione derivative. The buffering molecule and the solid support may be selected from those described above. This article may be used for storing a chemical compound in a non-aqueous solution or controlling a chemical transformation in a non-aqueous solution as described above.

Another aspect of the invention is a 1,3-cyclohexanedione derivative or a 1,3-cyclopentanedione derivative for buffering a non-aqueous solution. The 1,3-cyclohexanedione derivative or the 1,3-cyclopentanedione derivative may be selected from those described above.

EXAMPLES

The following examples are intended to illustrate the present invention, but are not intended to limit the scope of the appended claims.

Materials and Methods for Examples 1 to 4

Synthesis of Substituted cyclohexane-1,3-diones and Related Compounds 1

Synthesis of Compound 1c.

Compound 1c was synthesized as previously reported in X. Wu, Z. Chen, Y.-B. Bai, V. M. Dong, J. Am. Chem. Soc. 2016, 138, 12013.

Synthesis of Compound 1d.

Compound 1d was synthesized as previously reported in C. Kong, N. Jana, C. Jones, T. G. Driver, J. Am. Chem. Soc. 2016, 138, 13271.

Synthesis of Compound 1f.

Compound 1f was synthesized by a modified procedure of the previously reported method in X. Wu, Z. Chen, Y.-B. Bai, V. M. Dong, J. Am. Chem. Soc. 2016, 138, 12013. To a solution of cyclohexane-1,3-dione (200 mg, 1.78 mmol) and NaOH (71.3 mg, 13 mmol) in $H_2O$ (20 mL), 2-iodopropane (267 µL, 2.67 mmol) was added at room temperature (25° C.), and the mixture was heated at 100° C. for 5 h. After being cooled to room temperature, generated solid was collected by filtration. The solid was washed with $H_2O$ and hexane, dissolved in EtOAc-hexane, and purified by flash column chromatography (hexane/EtOAc=3:1) to give compound if (189.8 mg, 69%) as a colorless solid.

Synthesis of Compound 1j.

Compound 1j was synthesized by a modified procedure of the previously reported method in X. Wu, Z. Chen, Y.-B. Bai, V. M. Dong, J. Am. Chem. Soc. 2016, 138, 12013. To a solution of cyclohexane-1,3-dione (200 mg, 1.78 mmol) and NaOH (71.3 mg, 13 mmol) in $H_2O$ (20 mL), iodocyclohexane (345 µL, 2.67 mmol) was added at room temperature (25° C.), and the mixture was heated at 100° C. for 5 h. After being cooled to room temperature, generated solid was collected by filtration. The solid was washed with $H_2O$ and hexane and was purified by flash column chromatography (hexane/EtOAc=2:1) to give compound 1j (183.6 mg, 53%) as a colorless solid.

Synthesis of Compound 1k.

To a solution of cyclohexane-1,3-dione (200 mg, 1.78 mmol) and triphenylchloromethane (497.6 mg, 1.78 mmol) in $CH_2Cl_2$ (10 mL), $Et_3N$ (373 µL, 2.67 mmol) was added at room temperature (25° C.), and the solution was stirred at the same temperature for 12 h. The mixture was washed with $H_2O$, dried over $Na_2SO_4$, concentrated, and purified by flash column chromatography (hexane/EtOAc=5:1) to give compound 1k (391.6 mg, 62%) as a colorless solid.

Synthesis of Resin-Conjugated 1b.

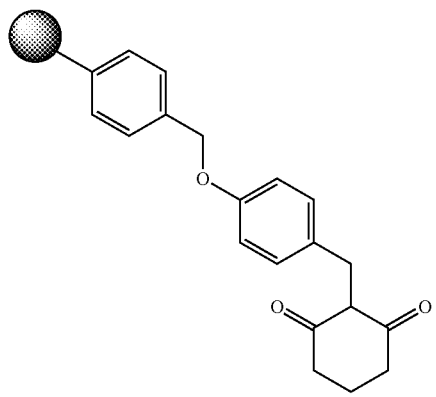

[Chem.7]

A method reported for the synthesis of 2-benzyl-1,3-cyclohexanedione from benzaldehyde and 1,3-cyclohexanedione was used (Y. Wu, I. Arenas, L. M. Broomfield, E. Martin, A. Shafir, Chem. Eur. J. 2015, 21, 18779). A mixture of 4-benzyloxybenzaldehyde resin (Chem-Impex International, Wang resin, polystyrene resin cross-linked with divinylbenzene, 100-200 mesh, 2.5-3.0 mmol/g, 1.00 g), 1,3-cyclohexanedione (841 mg, 7.50 mmol), diethyl 1,4-dihydro-2,6-dimethyl-3,5-pyridinedicarboxylate (Hantzsh ester, 1.90 g, 7.50 mmol), and L-proline (57.6 mg, 0.50 mmol) in $CH_2Cl_2$ (40 mL) was stirred at 70° C. for 3 days. After being cooled to room temperature, the mixture was filtered, and the beads were sequentially washed with $CH_2Cl_2$, acetone, $H_2O$, acetone, and $CH_2Cl_2$ (the beads were stirred in each of the washing solvents for at least 5 min, and filtered). This washing cycle was repeated 8 times. For each cycle, $CH_2Cl_2$ phase filtrate was recovered, concentrated, and analyzed by $^1H$ NMR. In the 7th and the 8th washing cycles, the NMR analysis confirmed that no compounds were included in the filtrates. The beads were dried under reduced pressure for 3 days to give resin-conjugated compound 1b. To use this resin-conjugated compound 1b, the loading of 1,3-cyclohexanedione on the beads was deduced to be 2.0 mmol/g from expected full conversion (2.5 mmol/1.24 g).

Evaluations of the Effects of Compound 1a in Isomerization of Compounds 2 to 3 (Tables 1 to 9 Below)

Table 1, entry 1. Compound 2 (12.7 mg, 0.0286 mmol) was dissolved in $CDCl_3$ (1.0 mL) in an NMR tube at room temperature (25° C.) and the solution was kept at the same temperature for 5 min with a closed cap. The solution was gently shaken and analyzed by $^1H$ NMR to determine the ratio of compound 2 to compound 3. Procedures for the other entries in Table 1 and the entries in Tables 2 to 9 were similar to that of entry 1 of Table 1 except that they were modified as shown in the tables.

Figure 2:
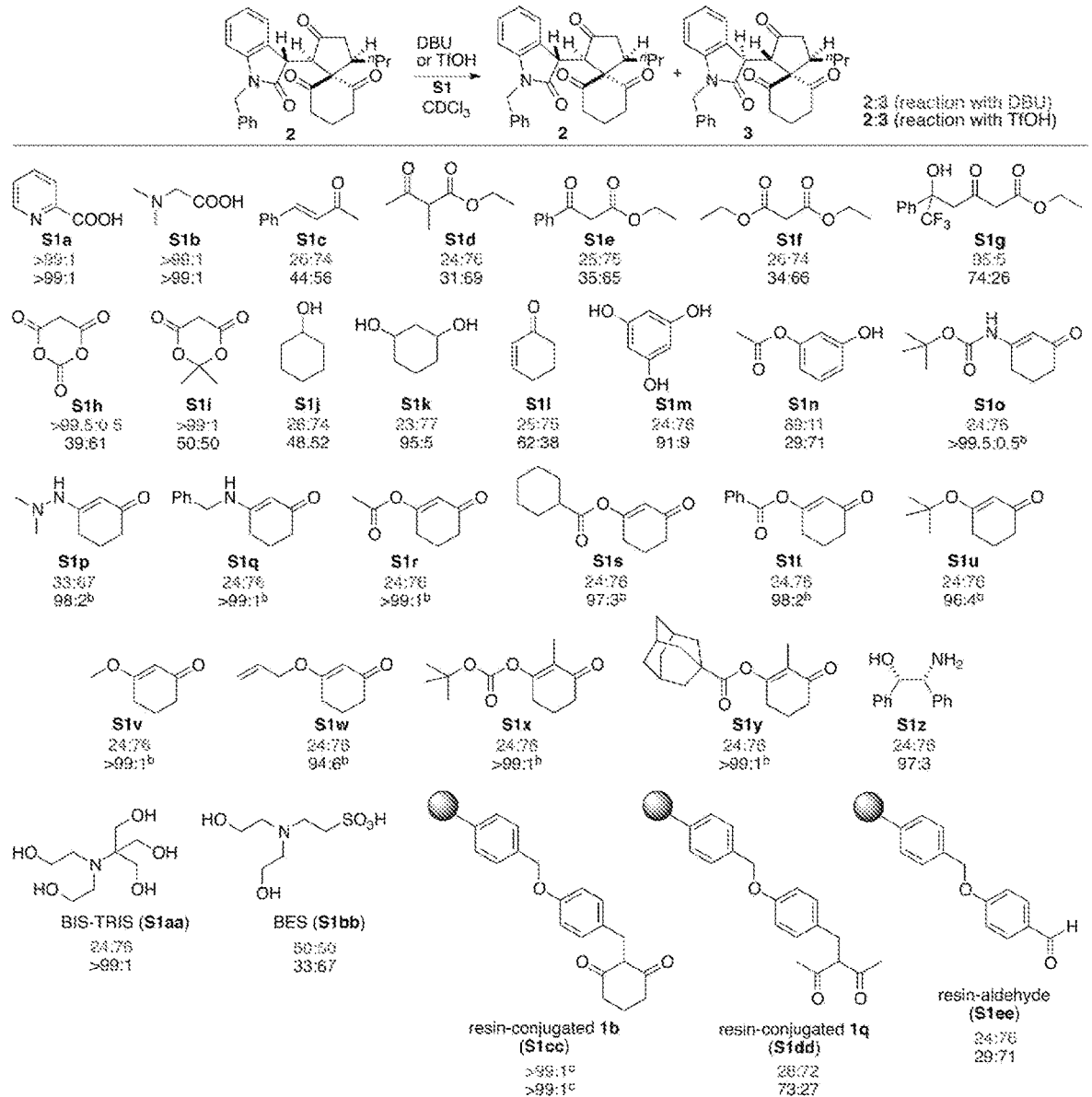
FIG. 2 illustrates compounds S1a through S1ee, and their effects of in the DBU-catalyzed and TfOH-catalyzed isomerization of compound 2.

Evaluations of the Effects of Compounds in Isomerization of Compounds 2 to 3 (FIGS. 1 and 2)

Procedure for Tests in FIGS. 1 and 2, With the DBU-Catalyzed Isomerization.

To a mixture of compound 2 (12.7 mg, 0.0286 mmol, 1.0 equiv) and compound to test (0.0286 mmol, 1.0 equiv) in $CDCl_3$ (1.0 mL) in an NMR tube, DBU (0.67 M in $CDCl_3$, 0.43 µL, $2.9 \times 10^{-4}$ mmol, 0.01 equiv) was added at room temperature (25° C.) and the mixture was kept at the same temperature for 5 min with a closed cap. The mixture was gently shaken and analyzed by $^1H$ NMR to determine the ratio of compound 2 to compound 3. With the use of compound 1a, the reaction mixture was homogeneous, clear solution. Compound 1b was less soluble in $CDCl_3$ than compound 1a, and the reaction mixture with compound 1b had insoluble precipitation (i.e., compound 1b was partially soluble and partially precipitated in the reaction mixture). Depending on the compound to test, the reaction mixture was clear solution or had insoluble precipitation. The NMR analysis was performed as described regardless the solubility of the compound to test in the reaction mixture.

Procedure for Tests in FIGS. 1 and 2, With the TfOH-Catalyzed Isomerization.

To a mixture of compound 2 (12.7 mg, 0.0286 mmol, 1.0 equiv) and compound to test (0.0286 mmol, 1.0 equiv) in $CDCl_3$ (1.0 mL) in an NMR tube, TfOH (1.1 M in $CD_3CN$, 2.53 µL, 0.00286 mmol, 0.1 equiv) was added at room temperature (25° C.) and the mixture was kept with a closed cap at 60° C. using an oil bath for 1.0 h. After being cooled to room temperature, the solution was gently shaken and analyzed by $^1H$ NMR to determine the ratio of compound 2 to compound 3. Depending on the compound to test, the reaction mixture was clear solution or had insoluble precipitation.

Figure 3:
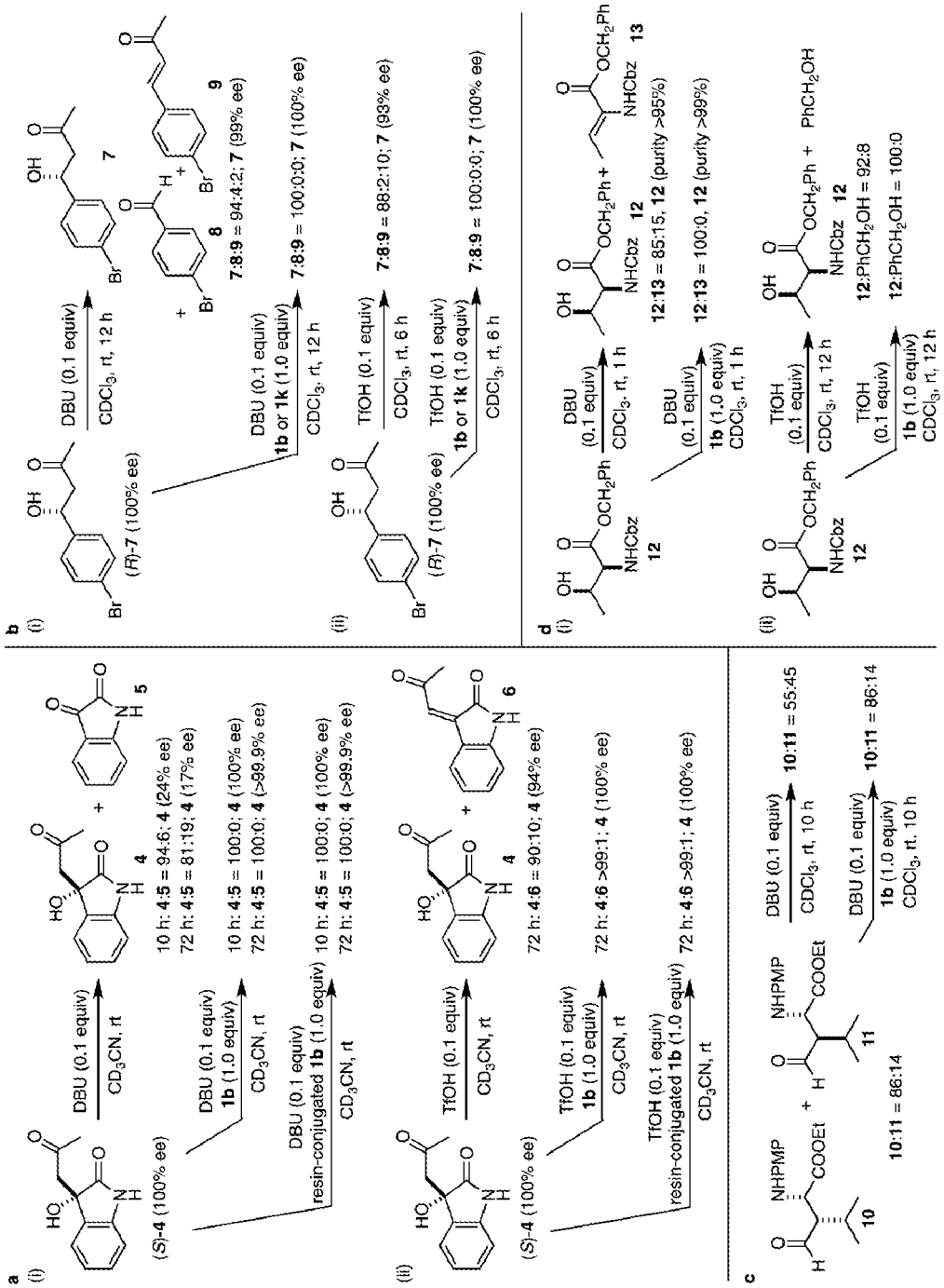
FIG. 3 illustrates effects of 2-methyl-1,3-cyclohexanedione (1b) and related 1,3-cyclohexanedione derivatives on the isomerizations and decompositions of compounds. Scheme a) shows effects on the racemization and decomposition of (β-hydroxyketone derivative (aldol) 4. Scheme b) shows effects on the racemization and decomposition of β-hydroxyketone derivative (aldol) 7. Scheme c) shows effects on the isomerization of amino aldehyde derivatives (Mannich reaction products) 10 and 11. Scheme d) shows effects on the isomerization and decomposition of β-hydroxy α-amino acid derivative 12.

Evaluations of the Effects of Compound 1b and Related Compounds in Isomerization and Decomposition of Compound 4 (FIG. 3, Scheme a)

(a) Procedures for FIG. 3, Scheme a (i)

FIG. 3, Scheme a (i) in the Absence of Buffering Molecule.

To a solution of compound (S)-4 (100% ee, 41.1 mg, 0.20 mmol, 1.0 equiv) in $CD_3CN$ (3.5 mL) in a glass vial, DBU (3.0 µL, 0.020 mmol, 0.1 equiv) was added at room temperature (25° C.), and the solution was stirred at the same temperature with a closed cap. At each of the indicated time points, a portion of the solution was transformed to an NMR tube and analyzed by $^1H$ NMR. The NMR analysis showed the formation of compound 5, and the ratio of compound 4 to compound 5 was determination by the $^1H$ NMR analysis. Immediately after the NMR analysis, the NMR-analyzed portion of the reaction mixture was directly purified by preparative TLC (hexane/EtOAc=1:1) to recover compound 4, which was analyzed by HPLC to determine the enantiopurity. HPLC (Daicel Chiralpak IC-3, hexane/2-PrOH=70:30, 0.5 mL/min, λ=254 nm): $t_R$ (major enantiomer, (S)-4) =38.3 min, $t_R$ (minor enantiomer, (R)-4)=33.6 min.

FIG. 3, Scheme a (i) in the Presence of Compound 1b.

To a solution of compound (S)-4 (100% ee, 41.1 mg, 0.20 mmol, 1.0 equiv) and compound 1b (25.3 mg, 0.20 mmol, 1.0 equiv) in $CD_3CN$ (3.5 mL) in a glass vial, DBU (3.0 µL, 0.020 mmol, 0.1 equiv) was added at room temperature (25° C.), and the resulting solution was stirred at the same temperature with a closed cap. At each of the indicated time points, a portion of the solution was transformed to an NMR tube and analyzed by $^1H$ NMR. The NMR analysis showed that compound 4 was unchanged and there was no formation of compound 5. Immediately after the NMR analysis, the NMR-analyzed portion of the reaction mixture was directly purified by preparative TLC (hexane/EtOAc=1:1) to recover compound 4, which was analyzed by HPLC to determine the enantiopurity. HPLC conditions used were the same as those described in FIG. 3, Scheme a (i) in the absence of buffering molecule.

FIG. 3, Scheme a (i) in the Presence of Resin-Conjugated Compound 1b.

To a solution of compound (S)-4 (100% ee, 41.1 mg, 0.20 mmol, 1.0 equiv) and resin-conjugated 1b (2.0 mmol/g, 99.2 mg, 0.20 mmol, 1.0 equiv) in $CD_3CN$ (3.5 mL) in a glass vial, DBU (3.0 µL, 0.020 mmol, 0.1 equiv) was added at room temperature (25° C.), and the resulting solution was stirred at the same temperature with a closed cap. At each of the indicated time points, a portion of the solution was transformed to an NMR tube and analyzed by $^1$H NMR. The NMR analysis showed that compound 4 was unchanged and there was no formation of compound 5. Immediately after the NMR analysis, the NMR-analyzed portion of the reaction mixture was directly purified by preparative TLC (hexane/EtOAc=1:1) to recover compound 4, which was analyzed by HPLC to determine the enantiopurity. HPLC conditions used were the same as those described in FIG. 3, Scheme a (i) in the absence of buffering molecule.

The procedures for tests in Tables 10 to 13 were similar to those in FIG. 3 except that they were modified as shown in the tables.

(b) Procedures for Tests in FIG. 3, Scheme a (ii)

FIG. 3, Scheme a (ii) in the Absence of Buffering Molecule.

To a solution of compound (S)-4 (100% ee, 41.1 mg, 0.20 mmol, 1.0 equiv) in CD$_3$CN (3.5 mL) in a glass vial, TfOH (1.8 μL, 0.020 mmol, 0.1 equiv) was added at room temperature (25° C.), and the solution was stirred at the same temperature with a closed cap. At the indicated reaction time point (72 h), a portion of the solution was transformed to an NMR tube and analyzed by $^1$H NMR. The NMR analysis showed the formation of compound 6, and the ratio of 4 to 6 was determination by the $^1$H NMR analysis. Immediately after the NMR analysis, the NMR-analyzed portion of the reaction mixture was directly purified by preparative TLC (hexane/EtOAc=1:1) to recover compound 4, which was analyzed by HPLC to determine the enantiopurity. HPLC conditions used were the same as those described in the procedures for FIG. 3, Scheme a (i). Compound 6 was also isolated from the reaction mixture by flash column chromatography (hexane/EtOAc=2:1), and the structure was confirmed.

FIG. 3, Scheme a (ii) in the Presence of Compound 1b.

To a solution of compound (S)-4 (100% ee, 41.1 mg, 0.20 mmol, 1.0 equiv) and compound 1b (25.3 mg, 0.20 mmol, 1.0 equiv) in CD$_3$CN (3.5 mL) in a glass vial, TfOH (1.8 μL, 0.020 mmol, 0.1 equiv) was added at room temperature (25° C.), and the solution was stirred at the same temperature with a closed cap. At the indicated reaction time point (72 h), a portion of the solution was transformed to an NMR tube and analyzed by $^1$H NMR. The NMR analysis showed compound 4 was almost unchanged and the formation of compound 6 was less than 1% of compound 4. Immediately after the NMR analysis, the NMR-analyzed portion of the reaction mixture was directly purified by preparative TLC (hexane/EtOAc=1:1) to recover compound 4, which was analyzed by HPLC to determine the enantiopurity. HPLC conditions used were the same as those described in the procedures for FIG. 3, Scheme a (i).

FIG. 3, Scheme a (ii) in the Presence of Resin-Conjugated Compound 1b.

To a solution of compound (S)-4 (100% ee, 41.1 mg, 0.20 mmol, 1.0 equiv) and resin-conjugated compound 1b (2.0 mmol/g, 99.2 mg, 0.20 mmol, 1.0 equiv) in CD$_3$CN (3.5 mL) in a glass vial, TfOH (1.8 μL, 0.020 mmol, 0.1 equiv) was added at room temperature (25° C.), and the solution was stirred at the same temperature with a closed cap. At the indicated reaction time point (72 h), a portion of the solution was transformed to an NMR tube and analyzed by $^1$H NMR. The NMR analysis showed compound 4 was almost unchanged and the formation of compound 6 was less than 1% of compound 4. Immediately after the NMR analysis, the NMR-analyzed portion of the reaction mixture was directly purified by preparative TLC (hexane/EtOAc=1:1) to recover compound 4, which was analyzed by HPLC to determine the enantiopurity. HPLC conditions used were the same as those described in the procedures for FIG. 3, Scheme a (i).

Additional Results to FIG. 3, Scheme a (ii), in CDCl$_3$.

To a mixture of compound (S)-4 (100% ee, 5.9 mg, 0.028 mmol, 1.0 equiv) and compound 1b (3.6 mg, 0.028 mmol, 1.0 equiv) in CDCl$_3$ (0.5 mL) in a glass vial, TfOH (1.1 M in CD$_3$CN, 2.5 μL, 2.8×10$^{-3}$ mmol, 0.1 equiv) was added at room temperature (25° C.), and the resulting mixture was stirred at the same temperature with a closed cap for 72 h. Compound 1b was partially soluble and partially precipitated in the reaction mixture. A portion of the solution was transformed to an NMR tube and analyzed by $^1$H NMR. The ratio of compound 4 to compound 6 was determined to be 4:6=98:2 by the $^1$H NMR analysis and the enantiopurity of compound 4 was determined to be 99.3% ee by the HPLC analysis as described in the procedures for FIG. 3, Scheme a (i). When the same reaction but without the addition of compound 1b was performed, the reaction mixture turned black after 1 h, which included the formation of complex mixtures by $^1$H NMR analysis.

Evaluations of the Effects of Compound 1b and Related Compounds in Isomerization and Decomposition of Compound 7 (FIG. 3, Scheme b)

(a) Procedures for FIG. 3, Scheme b (i)

FIG. 3, Scheme b (i) in the Absence of Buffering Molecule.

To a solution of compound (R)-7 (100% ee, 20.0 mg, 0.0823 mmol, 1.0 equiv) in CDCl$_3$ (0.5 mL) in a glass vial, DBU (1.3 μL, 0.0082 mmol, 0.1 equiv) was added at room temperature (25° C.), and the solution was stirred at the same temperature with a closed cap. At the indicated reaction time point (12 h), a portion of the solution was transformed to an NMR tube and analyzed by $^1$H NMR. The NMR analysis showed the formation of compounds 8 and 9, and the ratio of compound 7 to compounds 8 and 9 was determination by the $^1$H NMR analysis. The $^1$H NMR analysis also showed that ketone α-positions of 7 were partly deuterated. Immediately after the NMR analysis, the NMR-analyzed portion of the reaction mixture was directly purified by preparative TLC (hexane/EtOAc=5:1) to recover compound 7, which was analyzed by HPLC to determine the enantiopurity. HPLC (Daicel Chiralpak AS-H, hexane/2-PrOH=90:10, 0.5 mL/min, λ=220 nm): $t_R$ (major enantiomer, (R)-7)=28.3 min, $t_R$ (minor enantiomer, (S)-7)=34.1 min. Compounds 8 and 9 were also isolated from the reaction by flash column chromatography (hexane/EtOAc=5:1), and the structures were confirmed.

FIG. 3, Scheme b (i) in the Presence of Compound 1b.

To a mixture of compound (R)-7 (100% ee, 20.0 mg, 0.0823 mmol, 1.0 equiv) and compound 1b (10.4 mg, 0.0823 mmol, 1.0 equiv) in CDCl$_3$ (0.5 mL) in a glass vial, DBU (1.3 μL, 0.0082 mmol, 0.1 equiv) was added at room temperature (25° C.), and the resulting mixture was stirred at the same temperature with a closed cap. Compound 1b was partially soluble and partially precipitated in the reaction mixture. At the indicated reaction time point (12 h), a portion of the solution was transformed to an NMR tube and analyzed by $^1$H NMR. The NMR analysis showed that compound 7 was unchanged. Immediately after the NMR analysis, the NMR-analyzed portion of the reaction mixture was directly purified by preparative TLC (hexane/EtOAc=5:1) to recover compound 7, which was analyzed by HPLC to determine the enantiopurity.

FIG. 3, Scheme b (i) in the Presence of Compound 1k.

To a solution of compound (R)-7 (100% ee, 20.0 mg, 0.0823 mmol, 1.0 equiv) and compound 1k (29.2 mg, 0.0823 mmol, 1.0 equiv) in CDCl$_3$ (0.5 mL) in a glass vial, DBU (1.3 µL, 0.0082 mmol, 0.1 equiv) was added at room temperature (25° C.), and the resulting mixture was stirred at the same temperature with a closed cap. At the indicated reaction time point (12 h), a portion of the solution was transformed to an NMR tube and analyzed by $^1$H NMR. The NMR analysis showed that compound 7 was unchanged. Immediately after the NMR analysis, the NMR-analyzed portion of the reaction mixture was directly purified by preparative TLC (hexane/EtOAc=5:1) to recover compound 7, which was analyzed by HPLC to determine the enantiopurity.

(b) Procedures for FIG. 3, Scheme b (ii)

FIG. 3, Scheme b (ii) in the Absence of Buffering Molecule.

To a solution of compound (R)-7 (100% ee, 20.0 mg, 0.0823 mmol, 1.0 equiv) in CDCl$_3$ (0.5 mL) in a glass vial, TfOH (0.73 µL, 0.0082 mmol, 0.1 equiv) was added at room temperature (25° C.), and the solution was stirred at the same temperature with a closed cap. At the indicated reaction time point (6 h), a portion of the solution was transformed to an NMR tube and analyzed by $^1$H NMR. The NMR analysis showed the formation of compounds 8 and 9, and the ratio of compound 7 to compounds 8 and 9 was determined by the $^1$H NMR analysis. Immediately after the NMR analysis, the NMR-analyzed portion of the reaction mixture was directly purified by preparative TLC (hexane/EtOAc=5:1) to recover compound 7, which was analyzed by HPLC to determine the enantiopurity. Compound 9 was also isolated from the reaction mixture to confirm the structure.

FIG. 3, Scheme b (ii) in the Presence of Compound 1b.

To a mixture of compound (R)-7 (100% ee, 20.0 mg, 0.0823 mmol, 1.0 equiv) and compound 1b (10.4 mg, 0.0823 mmol, 1.0 equiv) in CDCl$_3$ (0.5 mL) in a glass vial, TfOH (0.73 µL, 0.0082 mmol, 0.1 equiv) was added at room temperature (25° C.), and the resulting mixture was stirred at the same temperature with a closed cap. Compound 1b was partially soluble and partially precipitated in the reaction mixture. At the indicated reaction time point (6 h), a portion of the solution was transformed to an NMR tube and analyzed by $^1$H NMR. The NMR analysis showed that compound 7 was unchanged. Immediately after the NMR analysis, the NMR-analyzed portion of the reaction mixture was directly purified by preparative TLC (hexane/EtOAc=5:1) to recover compound 7, which was analyzed by HPLC to determine the enantiopurity of compound 7.

FIG. 3, Scheme b (ii) in the Presence of Compound 1k.

To a solution of compound (R)-7 (100% ee, 20.0 mg, 0.0823 mmol, 1.0 equiv) and compound 1k (29.2 mg, 0.0823 mmol, 1.0 equiv) in CDCl$_3$ (0.5 mL) in a glass vial, TfOH (0.73 µL, 0.0082 mmol, 0.1 equiv) was added at room temperature (25° C.), and the solution was stirred at the same temperature with a closed cap. At the indicated reaction time point (6 h), a portion of the solution was transformed to an NMR tube and analyzed by $^1$H NMR. The NMR analysis showed that compound 7 was unchanged. Immediately after the NMR analysis, the NMR-analyzed portion of the reaction mixture was directly purified by preparative TLC (hexane/EtOAc=5:1) to recover compound 7, which was analyzed by HPLC to determine the enantiopurity of compound 7.

Evaluations of the Effects of Compound 1b in Isomerization of Compound 10 (FIG. 3, Scheme c)

(a) Procedures for FIG. 3, Scheme c

FIG. 3, Scheme c in the Absence of Buffering Molecule.

To a solution of compound (±)-10/11 (10:11=86:14, 23.9 mg, 0.0815 mmol, 1.0 equiv) in CDCl$_3$ (1.0 mL) in a glass vial, DBU (1.2 µL, 0.0081 mmol, 0.1 equiv) was added at room temperature (25° C.), and the solution was stirred at the same temperature with a closed cap. At the indicated reaction time point (10 h), a portion of the solution was transferred to an NMR tube and analyzed by $^1$H NMR. The NMR analysis showed the ratio 10/11 was altered from that before addition of DBU, and the ratio of compound 10 to compound 11 was determination by the $^1$H NMR analysis.

FIG. 3, Scheme c in the Presence of Compound 1b.

To a mixture of compound (±)-10/11 (10:11=86:14, 23.9 mg, 0.0815 mmol, 1.0 equiv) and compound 1b (10.3 mg, 0.0815 mmol, 1.0 equiv) in CDCl$_3$ (1.0 mL) in a glass vial, DBU (1.2 µL, 0.0081 mmol, 0.1 equiv) was added at room temperature (25° C.), and the resulting mixture was stirred at the same temperature with a closed cap. Compound 1b was partially soluble and partially precipitated in the reaction mixture. At the indicated reaction time point (10 h), a portion of the solution was transferred to an NMR tube and analyzed by $^1$H NMR. The NMR analysis showed that the ratio 10/11 was unchanged.

Evaluations of the Effects of Compound 1b in Isomerization and Decomposition of Compound 12 (FIG. 3, Scheme d)

(a) Procedures for FIG. 3, Scheme d

FIG. 3, Scheme d (i) in the Absence of Buffering Molecule.

To a solution of L-threonine derivative 12 (100 mg, 0.29 mmol, 1.0 equiv) in CDCl$_3$ (5.0 mL) in a glass vial, DBU (4.4 µL, 0.029 mmol, 0.1 equiv) was added at room temperature (25° C.), and the solution was stirred at the same temperature for 1.0 h with a closed cap. A portion of the solution was transferred to an NMR tube and analyzed by $^1$H NMR. The NMR analysis showed the formation of compound 13 and the ratio 12/13 was determined to be 85:15 by the $^1$H NMR analysis. Immediately after the NMR analysis, the solution was purified by flash chromatography (hexane/EtOAc=3:1) to isolate compounds 12 and 13. The recovered compound 12 was analyzed by $^1$H NMR and the purity of compound 12 was >95%. The $^1$H NMR suggested that the impurity (less than 5% of compound 12) was the diastereomer of compound 12 (the impurity had the same R$_f$ value with compound 12). HPLC analysis also showed the presence of impurity that was probably the diastereomer of compound 12; HPLC (Daicel Chiralpak IC-3, hexane/2-PrOH=90:10, 0.5 mL/min, λ=254 nm): t$_R$ (12)=57.6 min, t$_R$ (impurity, probably the diastereomer of compound 12)=53.9 min.

FIG. 3, Scheme d (i) in the Presence of Compound 1b.

To a mixture of L-threonine derivative 12 (100 mg, 0.29 mmol, 1.0 equiv) compound 1b (36.8 mg, 0.29 mmol, 1.0 equiv) in CDCl$_3$ (5.0 mL) in a glass vial, DBU (4.4 µL, 0.029 mmol, 0.1 equiv) was added at room temperature (25° C.), and the resulting mixture was stirred at the same temperature for 1.0 h with a closed cap. Compound 1b was partially soluble and partially precipitated in the reaction mixture. A portion of the solution was transferred to an NMR tube and analyzed by $^1$H NMR. The NMR analysis showed that compound 12 was unchanged. Immediately after the NMR analysis, the solution was purified by flash column chromatography (hexane/EtOAc=3:1) to isolate compound 12. The recovered compound 12 was analyzed by $^1$H NMR, which indicated that recovered compound 12 was pure and that there was no sign of the presence of diastereomer of compound 12 or other impurities with the recovered compound 12. HPLC analysis also supported the purity of the recovered compound 12.

FIG. 3, Scheme d (ii) in the Absence of Buffering Molecule.

To a solution of L-threonine derivative 12 (100 mg, 0.29 mmol, 1.0 equiv) in CDCl$_3$ (5.0 mL) in a glass vial, TfOH (2.6 µL, 0.029 mmol, 0.1 equiv) was added at room temperature (25° C.), and the solution was stirred at the same temperature for 12 h with a closed cap. A portion of the solution was transferred to an NMR tube and analyzed by $^1$H NMR. The NMR analysis showed the formation of benzyl alcohol and the ratio compound 12/benzyl alcohol was determined by the $^1$H NMR analysis. Immediately after the NMR analysis, the solution was purified by flash chromatography (hexane/EtOAc=3:1) to isolate compound 12 and benzyl alcohol. The structure of the isolated benzyl alcohol was confirmed by $^1$H and $^{13}$C NMR analyses. The recovered compound 12 was analyzed by $^1$H NMR and confirmed that there was no sign of the presence of diastereomer of compound 12.

FIG. 3, Scheme d (ii) in the Presence of Compound 1b.

To a mixture of L-threonine derivative 12 (100 mg, 0.29 mmol, 1.0 equiv) compound 1b (36.8 mg, 0.29 mmol, 1.0 equiv) in CDCl$_3$ (5.0 mL) in a glass vial, TfOH (2.6 µL, 0.029 mmol, 0.1 equiv) was added at room temperature (25° C.), and the resulting mixture was stirred at the same temperature for 12 h with a closed cap. Compound 1b was partially soluble and partially precipitated in the reaction mixture. A portion of the solution was transferred to an NMR tube and analyzed by $^1$H NMR. The NMR analysis showed that compound 12 was unchanged (no formation of benzyl alcohol was detected). After the NMR analysis, the solution was purified by flash column chromatography (hexane/EtOAc=3:1) to isolate compound 12. The recovered compound 12 was analyzed by $^1$H NMR and by HPLC, and was confirmed the purity.

Evaluations of the Effects of Compound 1b in Chemical Transformations: Protection of Hydroxy Group (FIG. 4)

Figure 4:
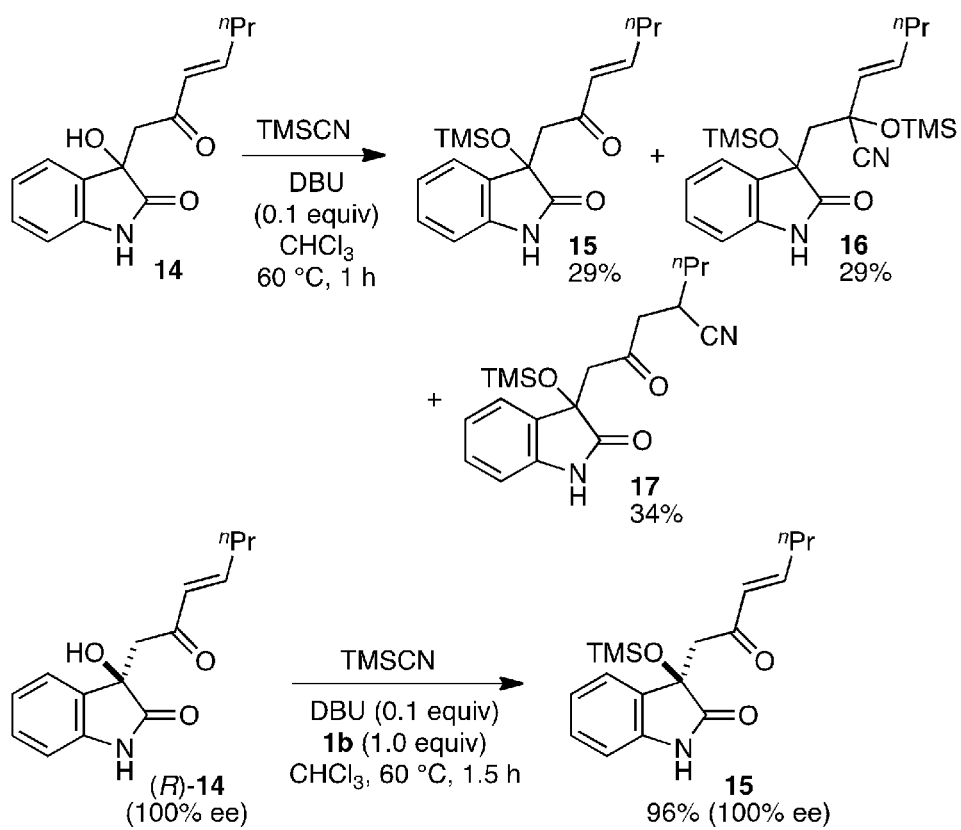
FIG. 4 illustrates effects of 2-methyl-1,3-cyclohexanedione (1b) on chemical transformations: protection of hydroxy groups of compound 14.

(a) Procedures for Scheme in FIG. 4

FIG. 4, Reaction of Compound 14 in the Absence of Buffering Molecule.

To a solution of (±)-14 (74.2 mg, 0.286 mmol, 1.0 equiv) and TMSCN (trimethylsilyl cyanide) (53.8 µL, 0.43 mmol, 1.5 equiv) in CHCl$_3$ (1.0 mL), DBU (4.3 µL, 0.029 mmol, 0.1 equiv) was added at room temperature (25° C.), and the resulting mixture was stirred at 60° C. for 1 h. After being cooled to room temperature, the reaction mixture was purified by flash column chromatography (hexane/EtOAc=5:1) to afford compound 15 (27.6 mg, 29%), compound 16 (35.7 mg, 29%, as a diastereomer mixture, dr=~10:1 estimated by TLC analysis), and 17 (34.9 mg, 34%). The major diastereomer of compound 16 was further purified by flash column chromatography (hexane/EtOAc=5:1).

FIG. 4, Reaction of Compound 14 in the Presence of Compound 1b.

To a solution of (R)-14 (74.3 mg, 0.286 mmol, 1.0 equiv), TMSCN (53.8 µL, 0.43 mmol, 1.5 equiv), and compound 1b (36.2 mg, 0.286 mmol, 1.0 equiv) in CHCl$_3$ (1.0 mL), DBU (4.3 µL, 0.029 mmol, 0.1 equiv) was added at room temperature (25° C.), and the resulting mixture was stirred at 60° C. for 1.5 h. After being cooled to room temperature, the reaction mixture was purified by flash column chromatography (hexane/EtOAc=5:1) to afford compound 15 (91.2 mg, 96%, 100% ee).

Evaluations of the Effects of Compound 1b in Chemical Transformations: Addition Reactions of Furans and Thiophen (FIG. 5)

Figure 5:
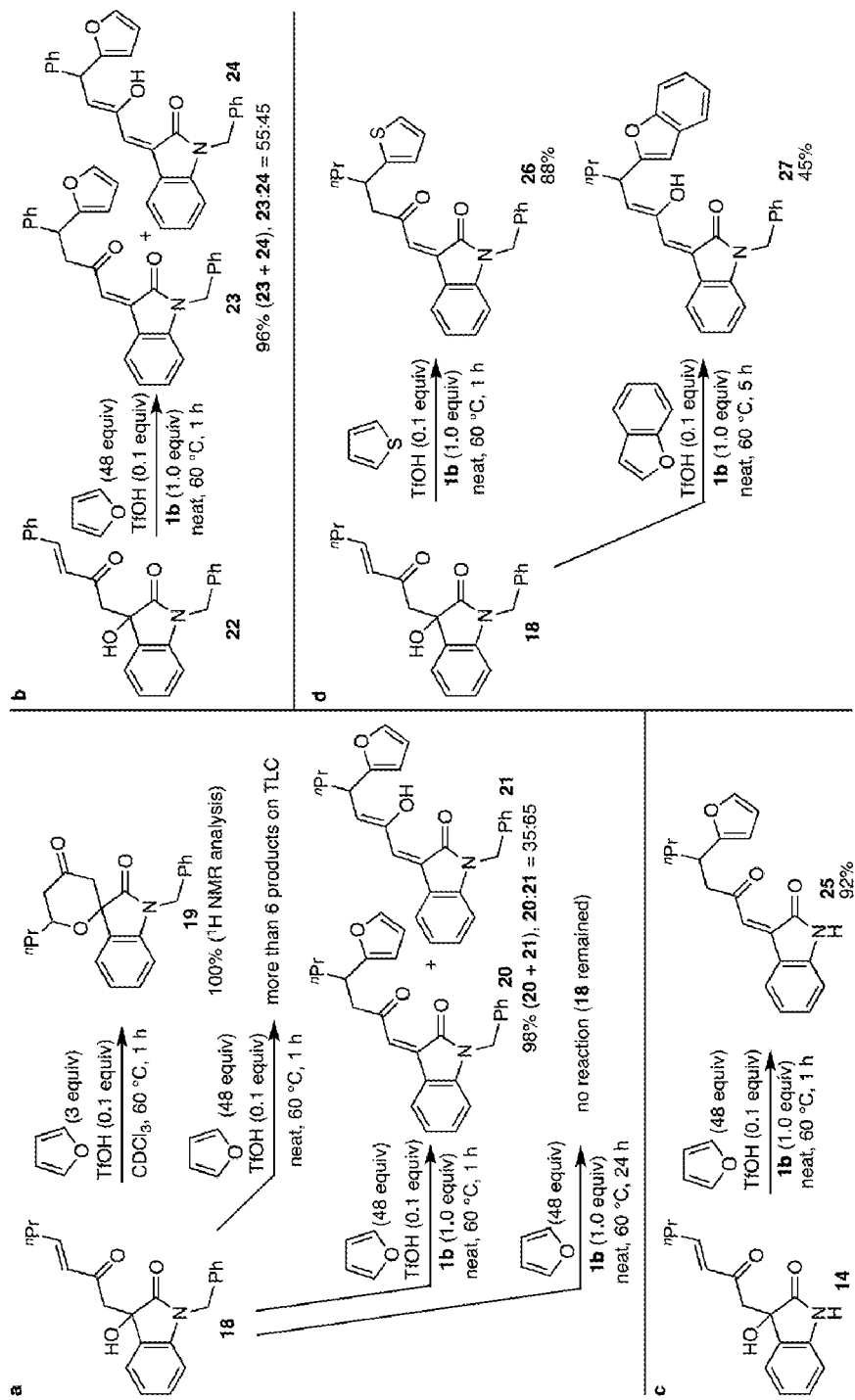
FIG. 5 illustrates effects of 2-methyl-1,3-cyclohexanedione (1b) on chemical transformations: addition reactions of compounds 14 (Scheme c), 18 (Scheme a and d), and 22 (Scheme b).

(a) Procedures for Schemes in FIG. 5

FIG. 5, Scheme a, Reaction of Compound 18 With Furan in CDCl$_3$ the Absence of Buffering Molecule.

To a solution of compound 18 (100 mg, 0.286 mmol, 1.0 equiv) and furan (62.5 µL, 0.860 mmol, 3.0 equiv) in CDCl$_3$ (1.0 mL), TfOH (2.5 µL, 0.029 mmol, 0.1 equiv) was added at room temperature (25° C.), and the mixture was stirred at 60° C. for 1.0 h. After being cooled to room temperature, the reaction mixture was analyzed by $^1$H NMR, which showed the formation of compound 19 (100% NMR yield).

FIG. 5, Scheme a, reaction of compound 18 with furan in the absence of buffering molecule under neat condition.

To a solution of compound 18 (100 mg, 0.286 mmol, 1.0 equiv) in furan (1.0 mL, 13.7 mmol, 48 equiv), TfOH (2.5 µL, 0.029 mmol, 0.1 equiv) was added at room temperature (25° C.), and the mixture was stirred at 60° C. for 1.0 h. TLC analysis of the reaction mixture showed the formation of more than 6 products, which were different from compound 20 or 21.

FIG. 5, Scheme a, Reaction of 18 With Furan in the Presence of Compound 1b.

To a solution of compound 18 (100 mg, 0.286 mmol, 1.0 equiv) and compound 1b (36.2 mg, 0.286 mmol, 1.0 equiv) in furan (1.0 mL, 13.7 mmol, 48 equiv), TfOH (2.5 µL, 0.029 mmol, 0.1 equiv) was added at room temperature (25° C.), and the mixture was stirred at 60° C. for 1.0 h. After being cooled to room temperature, the ratio 20/21 was determined by $^1$H NMR analysis, and the reaction mixture was purified by flash column chromatography (hexane/EtOAc=5:1) to give compounds 20 and 21 (combined 112 mg, 98%, 20:21=35:65). Compounds 20 and 21 were further purified by flash column chromatography (hexane/EtOAc=5:1) to isolate each other.

FIG. 5, Scheme a, Reaction of Compound 18 With Furan in the Presence of Compound 1b Without TfOH.

A solution of compound 18 (100 mg, 0.286 mmol, 1.0 equiv) and compound 1b (36.2 mg, 0.286 mmol, 1.0 equiv) in furan (1.0 mL, 13.7 mmol, 48 equiv) was stirred at 60° C. for 24 h. TLC analysis of the reaction mixture indicated that starting material 18 was unchanged (i.e., no reaction).

FIG. 5, Scheme b, Reaction of Compound 22 With Furan in the Presence of Compound 1b.

To a solution of compound 22 (109.6 mg, 0.286 mmol, 1.0 equiv) and compound 1b (36.2 mg, 0.286 mmol, 1.0 equiv) in furan (1.0 mL, 13.7 mmol, 48 equiv), TfOH (2.5 µL, 0.029 mmol, 0.1 equiv) was added at room temperature (25° C.), and the mixture was stirred at 60° C. for 1.0 h. After being cooled to room temperature, the ratio 23/24 was determined by $^1$H NMR analysis, and the reaction mixture was purified by flash column chromatography (hexane/EtOAc=5:1) to give compounds 23 and 24 (combined 118.9 mg, 96%, 23:24=55:45).

FIG. 5, Scheme c, Reaction of Compound 14 With Furan in the Presence of Compound 1b.

To a solution of compound 14 (74.2 mg, 0.286 mmol, 1.0 equiv) and compound 1b (36.2 mg, 0.286 mmol, 1.0 equiv) in furan (1.0 mL, 13.7 mmol, 48 equiv), TfOH (2.5 µL, 0.029 mmol, 0.1 equiv) was added at room temperature (25° C.), and the mixture was stirred at 60° C. for 1.0 h. After being cooled to room temperature, the reaction mixture was analyzed by $^1$H NMR and purified by flash column chromatography (hexane/EtOAc=5:1) to give compound 25 (81.4 mg, 92%).

FIG. 5, Scheme d, Reaction of Compound 18 With Thiophen in the Presence of Compound 1b.

To a solution of compound 18 (100 mg, 0.286 mmol, 1.0 equiv) and compound 1b (36.2 mg, 0.286 mmol, 1.0 equiv) in thiophen (1.0 mL, 12.5 mmol, 44 equiv), TfOH (2.5 µL, 0.029 mmol, 0.1 equiv) was added at room temperature (25° C.), and the mixture was stirred at 60° C. for 1.0 h. After being cooled to room temperature, the reaction mixture was analyzed by $^1$H NMR and purified by flash column chromatography (hexane/EtOAc=5:1) to give compound 26 (104.6 mg, 88%).

FIG. 5, Scheme d, Reaction of Compound 18 With Benzofuran in the Presence of Compound 1b.

To a solution of compound 18 (100 mg, 0.286 mmol, 1.0 equiv) and compound 1b (36.2 mg, 0.286 mmol, 1.0 equiv) in benzofuran (1.0 mL, 9.1 mmol, 32 equiv), TfOH (2.5 µL, 0.029 mmol, 0.1 equiv) was added at room temperature (25° C.), and the mixture was stirred at 60° C. for 5.0 h. After being cooled to room temperature, the reaction mixture was purified by flash column chromatography (hexane/EtOAc=3:1) to give compound 27 (60.1 mg, 45%).

Evaluations of the Effects of Compound 1b in Chemical Transformations: Dimerization of Isatin Aldol Derivatives (FIG. 6)

Figure 6:
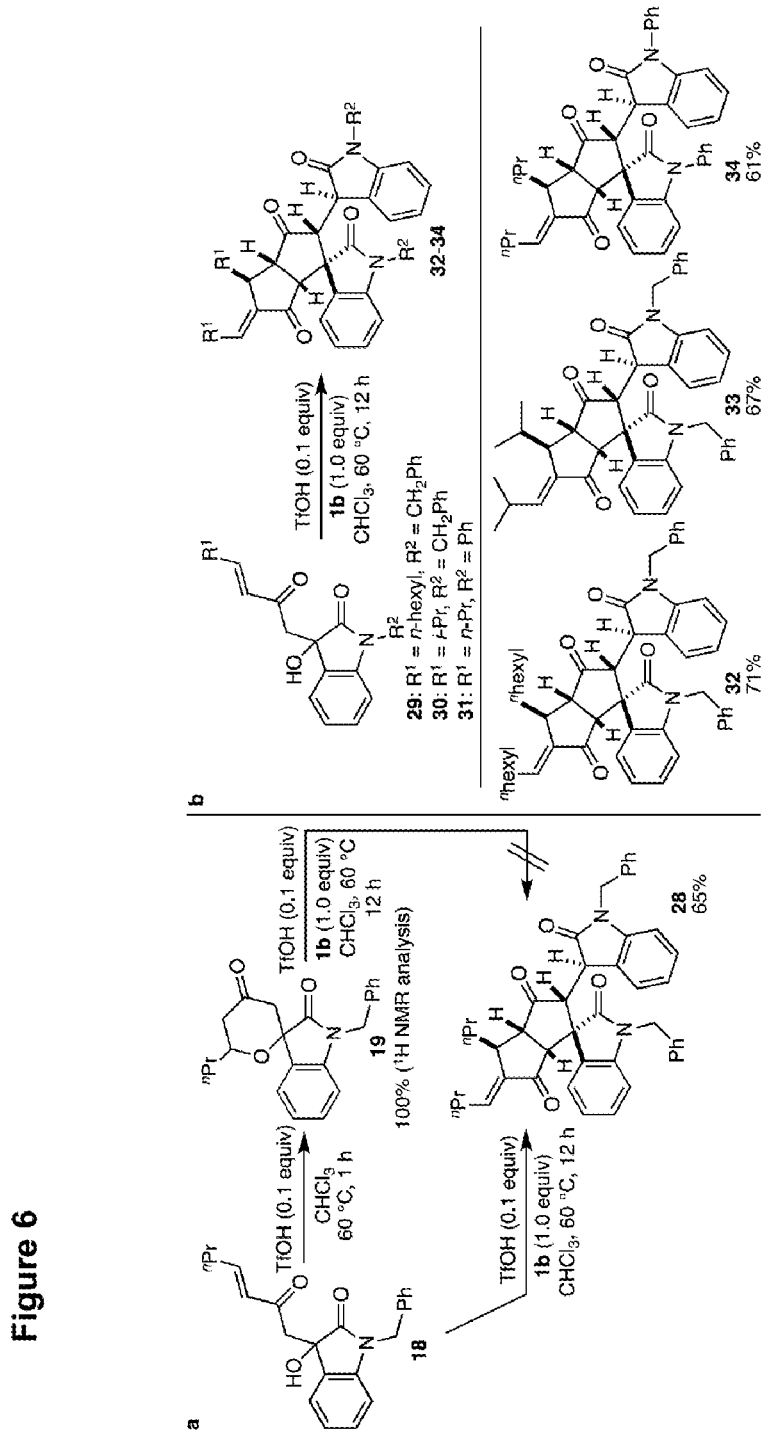
FIG. 6 illustrates effects of 2-methyl-1,3-cyclohexanedione (1b) on chemical transformations: dimerization reactions of isatin aldol derivatives 18 (Scheme a) and 29 through 31 (Scheme b) to afford spirooxindole octahydropentalenes.

(a) Procedures for Schemes in FIG. 6

FIG. 6, Scheme a, Reaction of Compound 18 in the Presence of TfOH in the Absence of Buffering Molecule.

To a solution of compound 18 (100 mg, 0.286 mmol, 1.0 equiv) in CHCl$_3$ (2.0 mL), TfOH (2.5 μL, 0.029 mmol, 0.1 equiv) was added at room temperature (25° C.), and the solution was stirred at 60° C. for 1 h. After being cooled to room temperature, a portion of the reaction mixture was diluted with CDCl$_3$ and analyzed by TLC and by $^1$H NMR, which showed the formation of compound 19 (100% NMR yield).

FIG. 6, Scheme a, Reaction of Compound 18 in the Presence of TfOH and Compound 1b.

To a mixture of compound 18 (100 mg, 0.286 mmol, 1.0 equiv) and compound 1b (36.2 mg, 0.286 mmol, 1.0 equiv) in CHCl$_3$ (2.0 mL), TfOH (2.5 μL, 0.029 mmol, 0.1 equiv) was added at room temperature (25° C.), and the mixture was stirred at 60° C. for 12 h. After being cooled to room temperature, the reaction mixture was purified by flash column chromatography (hexane/EtOAc=7:1) to give compound 28 (61.7 mg, 65%, single diastereomer (purity >95%)). Compound 28 was crystallized from MeOH and from CH$_2$Cl$_2$-hexane, respectively. Relative stereochemistry of compound 28 was determined by X-ray crystal structural analysis. The carbon-carbon double bond of compound 28 was partially isomerized from E to Z during storage.

FIG. 6, Scheme a, a Control Reaction, Reaction of Compound 19 in the Presence of TfOH and Compound 1b.

To a solution of compound 19 (25.0 mg, 0.071 mmol, 1.0 equiv) and compound 1b (9.0 mg, 0.071 mmol, 1.0 equiv) in CHCl$_3$ (0.5 mL), TfOH (0.63 μL, 0.007 mmol, 0.1 equiv) was added at room temperature (25° C.), and the solution was stirred at 60° C. for 12 h. After being cooled to room temperature, the reaction mixture was diluted with CDCl$_3$ and analyzed by $^1$H NMR, which showed that compound 19 was unchanged (i.e., no reaction).

FIG. 6, Scheme b, Reactions of Compound 29 in the Presence of TfOH and Compound 1b.

To a solution of compound 29 (112.1 mg, 0.286 mmol, 1.0 equiv) and compound 1b (36.2 mg, 0.286 mmol, 1.0 equiv) in CHCl$_3$ (2.0 mL), TfOH (2.5 μL, 0.029 mmol, 0.1 equiv) was added at room temperature (25° C.), and the solution was stirred at 60° C. for 12 h. After being cooled to room temperature, the reaction mixture was purified by flash column chromatography (hexane/EtOAc=7:1) to give compound 32 (75.9 mg, 71%).

FIG. 6, Scheme b, Reaction of Compound 30 in the Presence of TfOH and Compound 1b.

To a solution of compound 30 (100.1 mg, 0.286 mmol, 1.0 equiv) and compound 1b (36.2 mg, 0.286 mmol, 1.0 equiv) in CHCl$_3$ (2.0 mL), TfOH (2.5 μL, 0.029 mmol, 0.1 equiv) was added at room temperature (25° C.), and the solution was stirred at 60° C. for 12 h. After being cooled to room temperature, the reaction mixture was purified by flash column chromatography (hexane/EtOAc=7:1) to give compound 33 (63.6 mg, 67%).

FIG. 6, Scheme b, Reaction of Compound 31 in the Presence of TfOH and Compound 1b.

To a solution of compound 31 (95.9 mg, 0.286 mmol, 1.0 equiv) and compound 1b (36.2 mg, 0.286 mmol, 1.0 equiv) in CHCl$_3$ (2.0 mL), TfOH (2.5 μL, 0.029 mmol, 0.1 equiv) was added at room temperature (25° C.), and the solution was stirred at 60° C. for 12 h. After being cooled to room temperature, the reaction mixture was purified by flash column chromatography (hexane/EtOAc=7:1) to give compound 34 (55.3 mg, 61%).

Example 1

Evaluation of 1,3-cyclohexanedione to Inhibit Acid- and Base-Catalyzed Isomerization in Organic Solvents To test 1,3-cyclohexanedione for a buffering function of neutralizing both acids and bases in non-aqueous solutions, it was first examined whether 1,3-cyclohexanedione (1a):

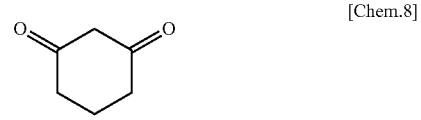

[Chem.8]

inhibited the isomerization of compound 2 to compound 3 catalysed by 1,8-diazabicyclo[5.4.0]undec-7-ene (DBU) at 25° C. and by trifluoromethanesulfonic acid (TfOH) at 60° C. in CDCl$_3$ as shown in Table 1.

TABLE 1

The effect of cyclohexane-1,3-dione (1a) in the DBU- and TfOH-catalysed isomerization of compound 2 to compound 3.[a]

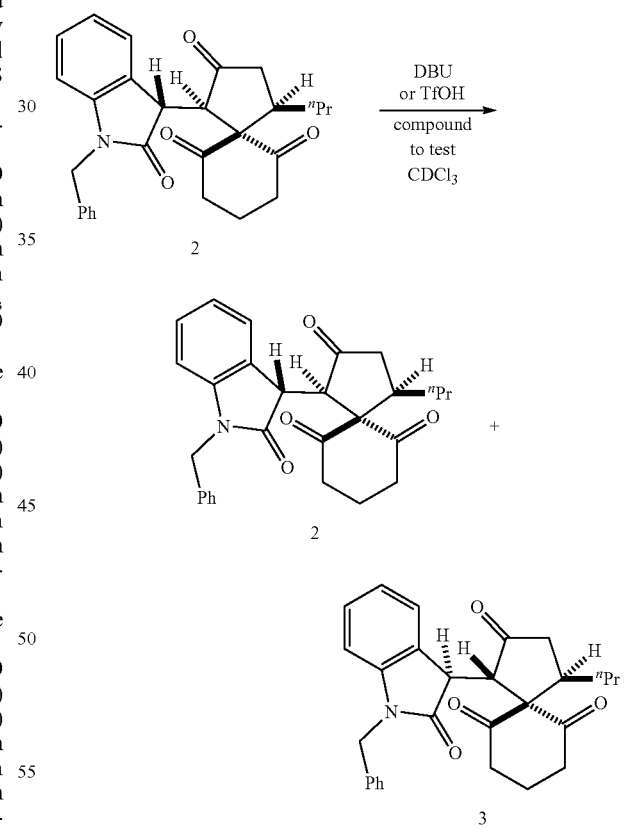

| entry | DBU or TfOH (condition) | compound to test | 2:3 |
|---|---|---|---|
| 1 | — (A) | — | >99.5:0.5 |
| 2 | DBU (A) | — | 24:76 (24:76)[b] |
| 3 | DBU (A) | 1a | >99.5:0.5 (>99:1)[b], >99:1[c] |
| 4 | DBU (A) | CH$_3$COOH | >99:1 |
| 5 | DBU (A) | PhCH$_2$NH$_2$ | 24:76 |
| 6 | — (B) | — | >99.5:0.5 |

TABLE 1-continued

The effect of cyclohexane-1,3-dione (1a) in the DBU- and TfOH-catalysed isomerization of compound 2 to compound 3.[a]

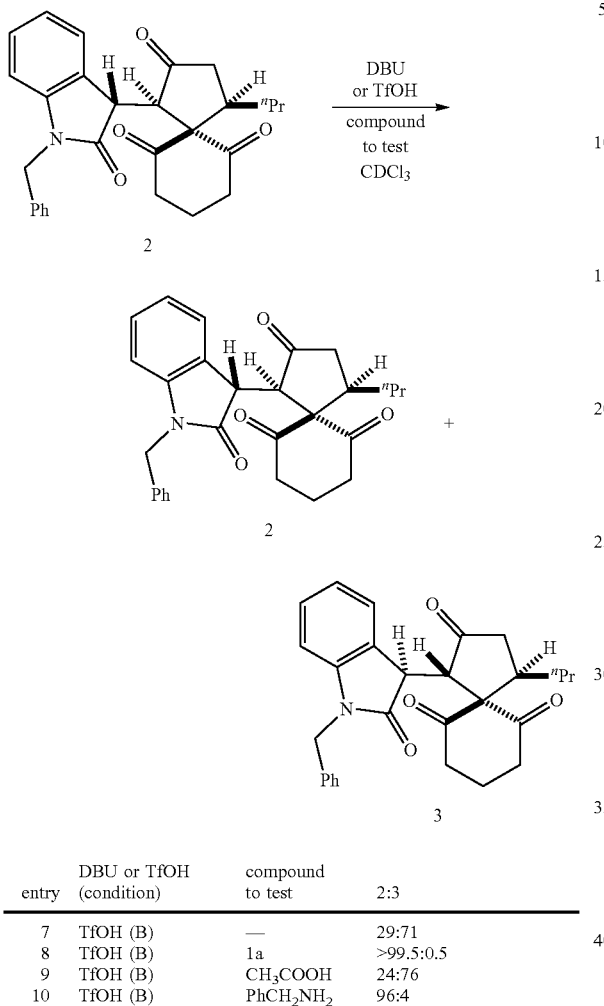

| entry | DBU or TfOH (condition) | compound to test | 2:3 |
|---|---|---|---|
| 7 | TfOH (B) | — | 29:71 |
| 8 | TfOH (B) | 1a | >99.5:0.5 |
| 9 | TfOH (B) | CH₃COOH | 24:76 |
| 10 | TfOH (B) | PhCH₂NH₂ | 96:4 |

[a]A mixture of 2 (2:3 >99.5:0.5, 1.0 equiv) and the test compound (1.0 equiv) in CDCl₃ was stirred in the presence of DBU (0.01 equiv) under condition A or TfOH (0.1 equiv) under condition B, and the ratio of 2:3 was determined by $^1$H NMR analysis at rt. Condition A: rt (room temperature) (25° C.) for 5 min; Condition B: 60° C. for 1 h.
[b]Data after 3 days.
[c]With DBU (0.1 equiv).

Compound 2 is a useful synthetic intermediate in the formation of spirooxindole polycycles and is readily isomerized to compound 3 under acidic or basic conditions (J.-R. Huang, M. Sohail, T. Taniguchi, K. Monde, F. Tanaka, Angew. Chem. Int. Ed. 2017, 56, 5853; Angew. Chem. 2017, 129, 5947; M. Sohail, F. Tanaka, Communications Chem. 2019, 2, 73, doi: 10.1038/s42004-019-0177-5). The ratio of compound 2 to compound 3 can be easily determined as described in J.-R. Huang, M. Sohail, T. Taniguchi, K. Monde, F. Tanaka, Angew. Chem. Int. Ed. 2017, 56, 5853; Angew. Chem. 2017, 129, 5947.

For the isomerization of compound 2 catalyzed by DBU, the ratio of compound 2 to compound 3 was 24:76 at 5 min after the addition of DBU (Table 1, entry 2). In the presence of compound 1a (1.0 equivalent relative to compound 2), compound 2 was unchanged or was not isomerized by the addition of DBU (Table 1, entry 3); formation of compound 3 was less than 1% even after 3 days in the presence of compound 1a. Similarly, in the presence of compound 1a, compound 2 did not isomerize to compound 3 by the addition of TfOH (Table 1, entry 8). Compound 1a blocked both the DBU-catalyzed and the TfOH-catalyzed isomerization of compound 2, indicating that compound 1a neutralized both the base and the acid. Acetic acid suppressed only the base-catalyzed isomerization (Table 1, entries 4 and 9), and benzylamine suppressed only the acid-catalyzed isomerization (Table 1, entries 5 and 10); that is, acetic acid neutralized only the base, and benzylamine neutralized only the acid. Thus, the effect of compound 1a on both the base and the acid in an organic solvent (Table 1, entries 3 and 8) was demonstrated; the results suggest that compound 1a has a buffering function in non-aqueous solutions.

Next, the capability of compound 1a to neutralize various bases and acids in an organic solvent was analyzed by evaluating the effect of compound 1a on the isomerization reaction of compound 2 to compound 3 catalyzed by various bases and acids as shown in Table 2.

TABLE 2

The effect of 1,3-cyclohexanedione (1a) in the isomerization of compound 2 to compound 3 in the presence of various bases and acids.[a]

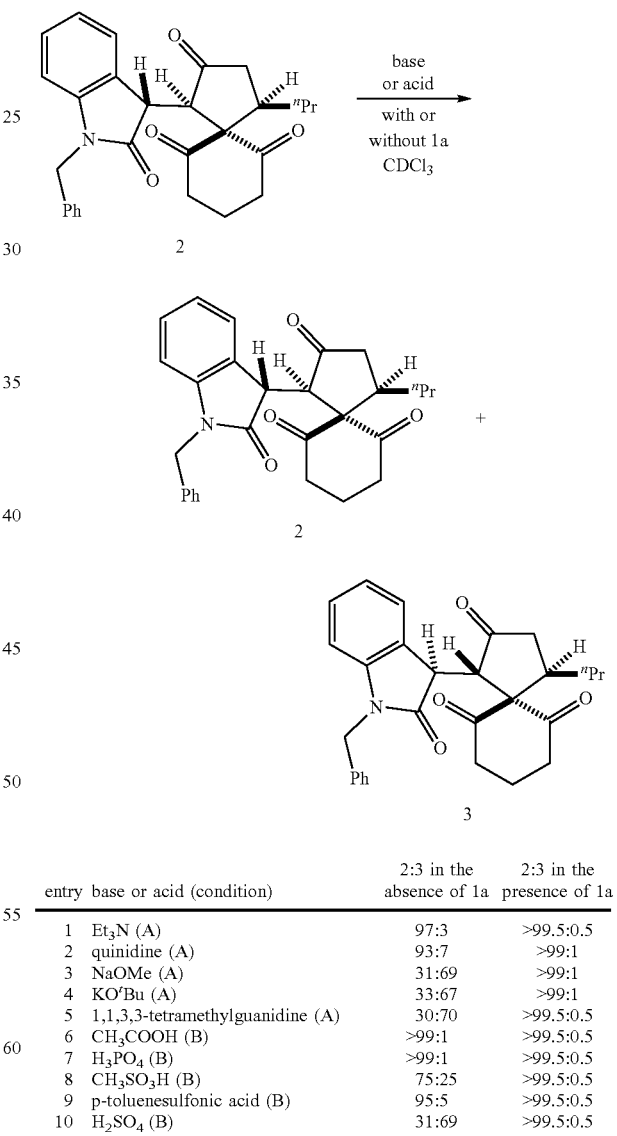

| entry | base or acid (condition) | 2:3 in the absence of 1a | 2:3 in the presence of 1a |
|---|---|---|---|
| 1 | Et₃N (A) | 97:3 | >99.5:0.5 |
| 2 | quinidine (A) | 93:7 | >99:1 |
| 3 | NaOMe (A) | 31:69 | >99:1 |
| 4 | KO$^t$Bu (A) | 33:67 | >99:1 |
| 5 | 1,1,3,3-tetramethylguanidine (A) | 30:70 | >99.5:0.5 |
| 6 | CH₃COOH (B) | >99:1 | >99.5:0.5 |
| 7 | H₃PO₄ (B) | >99:1 | >99.5:0.5 |
| 8 | CH₃SO₃H (B) | 75:25 | >99.5:0.5 |
| 9 | p-toluenesulfonic acid (B) | 95:5 | >99.5:0.5 |
| 10 | H₂SO₄ (B) | 31:69 | >99.5:0.5 |

[a]A mixture of 2 (2:3 >99.5:0.5, 1.0 equiv) in CDCl₃ in the absence and presence of 1a (1.0 equiv) was stirred with base (0.1 equiv) under condition A (25° C., for 5 min) or acid (0.1 equiv) under condition B (60° C. for 1 h), and the ratio 2:3 was determined by $^1$H NMR analyses at 45.

Although the degree of isomerization catalyzed by the bases and acids varied depending on the base or acid, compound 1a completely or almost completely suppressed the isomerization of compound 2 catalyzed by various bases such as potassium tert-butoxide and 1,1,3,3-tetramethylguanidine and by various acids such as methanesulfonic acid and p-toluenesulfonic acid. That is, the buffering function of compound 1a was observed in non-aqueous solutions against various bases and acids.

The scope of the inhibition function of compound 1a on the isomerization of compound 2 to compound 3, or the buffering function of compound 1a, was also investigated in various solvents as shown in Tables 3 and 4.

TABLE 3

The effect of 1,3-cyclohexanedione (1a) in the DBU-catalyzed isomerization of compound 2 to compound 3 in various solvents.[a]

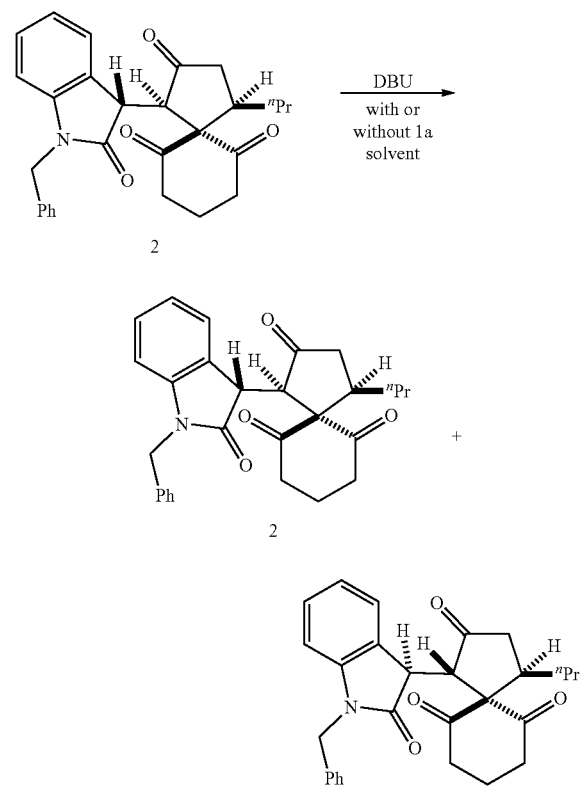

| entry | solvent | 2:3 in the absence of 1a | 2:3 in the presence of 1a |
| --- | --- | --- | --- |
| 1 | CHCl$_3$ | 24:76 | >99.5:0.5 |
| 2 | toluene-d$_6$ | 45:55 | >99.5:0.5 |
| 3 | CD$_3$CN | 26:74 | >99:1 |
| 4 | acetone-d$_6$ | 27:73 | >99:1 |
| 5[b] | 2-PrOH | 48:52 | >99:1 |
| 6 | 1,4-dioxane | 35:65 | 98:2 |
| 7 | THF | 30:70 | 96:4 |
| 8 | (CD$_3$)$_2$SO | 22:78 | 76:24 |
| 9 | DMF | 27:73 | 28:72 |
| 10[c] | 2-PrOH | 27:73 | 1:>99 |
| 11[c] | CD$_3$OD | 24:76 | 0.5:>99.5 |

[a]A mixture of 2 (2:3 >99.5:0.5, 1.0 equiv) and DBU (0.01 equiv) in indicated solvent (concentration of 2: 0.03M) was stirred in the absence and presence of 1a (1.0 equiv) at rt (25° C.) for 5 min. The ratio 2:3 was determined by 1H NMR analysis.
[b]Concentration of 2: 0.007M.
[c]Isomerization of 3: Compound 3 (3:2 >99.5:0.5) was used instead of 2; concentration 3: 0.007M.

TABLE 4

The effect of 1,3-cyclohexanedione (1a) in the TfOH-catalyzed isomerization of compound 2 to compound 3 in various solvents.[a]

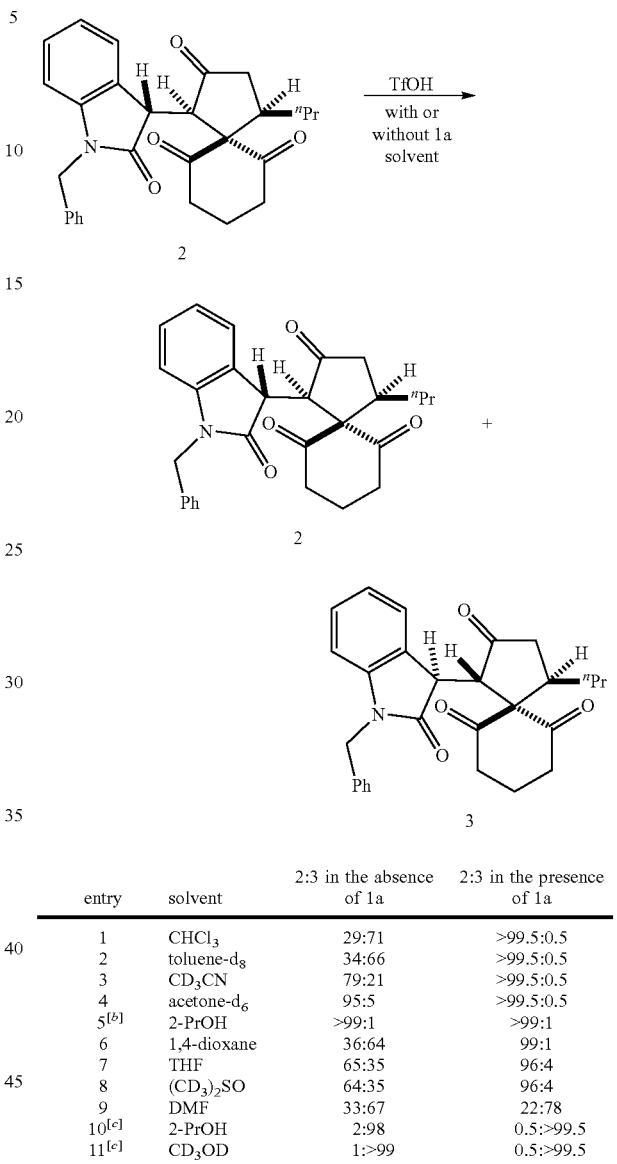

| entry | solvent | 2:3 in the absence of 1a | 2:3 in the presence of 1a |
| --- | --- | --- | --- |
| 1 | CHCl$_3$ | 29:71 | >99.5:0.5 |
| 2 | toluene-d$_8$ | 34:66 | >99.5:0.5 |
| 3 | CD$_3$CN | 79:21 | >99.5:0.5 |
| 4 | acetone-d$_6$ | 95:5 | >99.5:0.5 |
| 5[b] | 2-PrOH | >99:1 | >99:1 |
| 6 | 1,4-dioxane | 36:64 | 99:1 |
| 7 | THF | 65:35 | 96:4 |
| 8 | (CD$_3$)$_2$SO | 64:35 | 96:4 |
| 9 | DMF | 33:67 | 22:78 |
| 10[c] | 2-PrOH | 2:98 | 0.5:>99.5 |
| 11[c] | CD$_3$OD | 1:>99 | 0.5:>99.5 |

[a]A mixture of 2 (2:3 >99.5:0.5, 1.0 equiv) and TfOH (0.1 equiv) in solvent (concentration of 2: 0.03M) was stirred in the absence and presence of 1a (1.0 equiv) at 60° C. for 1 h. The ratio 2:3 was determined by 1H NMR analysis at rt.
[b]Concentration 2: 0.007M.
[c]Isomerization of 3: Compound 3 (3:2 >99.5:0.5) was used instead of 2; concentration of 3: 0.007M.

In all solvents tested, the isomerization of compound 2 to compound 3 by DBU or by TfOH was observed to some degree in the absence of compound 1a. In the presence of compound 1a, no isomerization of compound 2 was detected in chloroform or in toluene. In acetonitrile, acetone, 2-propanol, 1,4-dioxane, and tetrahydrofuran (THF), the isomerization of compound 2 to compound 3 was almost completely suppressed (less than 5%) in the presence of compound 1a. In dimethylsulfoxide (DMSO), the isomerization was partially inhibited by compound 1a. In polar solvents, changes in the pKa values of the base, of the acid, and of compound 1a from those in non-polar solvents may affect the neutralizing function of compound 1a, or the formation of hydrogen bonds between solvent molecules and compound 1a may prevent the interaction of compound 1a with the base or acid, resulting in a reduction of the buffering function of compound 1a. Although the buffering function of compound 1a did not work in some polar solvents, compound 1a buffered various organic solvents, including 2-propanol.

Compound 1a also inhibited the acid- and base-catalyzed isomerization of compound 2 to compound 3 over a wide range of concentrations as shown in Tables 5 and 6.

TABLE 5

Effects of 1,3-cyclohexanedione (1a) on DBU-catalyzed isomerization of compound 2 to compound 3 at various concentrations.

| en-try | concentration of 2 (concentration of 1a) (M) | 2:3 at 5 min | enol form:keto form of 1a at 5 min |
|---|---|---|---|
| 1 | $2.8 \times 10^{-3}$ | >99.5:0.5 | 8:92 |
| 2 | $4.7 \times 10^{-3}$ | >99.5:0.5 | 9:91 |
| 3 | $7.0 \times 10^{-3}$ | >99.5:0.5 | 11:89 |
| 4 | $1.4 \times 10^{-2}$ | >99.5:0.5 | 16:84 |
| 5 | $2.8 \times 10^{-2}$ | >99.5:0.5 | 25:75 |
| 6 | $5.7 \times 10^{-2}$ | >99.5:0.5 | 40:60[a] |
| 7 | $1.4 \times 10^{-1}$ | >99.5:0.5 | 80:20 |

[a] The ratio remained the same after 12 h.

TABLE 6

Effects of 1,3-cyclohexanedione (1a) on TfOH-catalyzed isomerization of compound 2 to compound 3 at various concentrations.

| en-try | concentration of 2 (concentrationo of 1a) (M) | 2:3 at 1 h | enol form:keto form of 1a at 1 h |
|---|---|---|---|
| 1 | $2.8 \times 10^{-3}$ | >99.5:0.5 | 14:86 |
| 2 | $4.7 \times 10^{-3}$ | >99.5:0.5 | 15:85 |
| 3 | $7.0 \times 10^{-3}$ | >99.5:0.5 | 17:83 |
| 4 | $1.4 \times 10^{-2}$ | >99.5:0.5 | 22:78 |
| 5 | $2.8 \times 10^{-2}$ | >99.5:0.5 | 30:70 |
| 6 | $5.7 \times 10^{-2}$ | >99.5:0.5 | 45:55 |
| 7 | $1.4 \times 10^{-1}$ | >99:1 | 84:16 |

When the DBU-catalyzed and TfOH-catalyzed isomerization reactions of compound 2 to compound 3 in CDCl$_3$ were analyzed over various concentrations of compound 2 in the presence of one equivalent of compound 1a, the isomerization was suppressed to less than 1% in the range from 0.003 M to 0.14 M.

Further, even when compound 1a was present at less than one equivalent relative to compound 2, the buffering function of 1a was observed as shown in Tables 7 and 8.

TABLE 7

Effects of 1,3-cyclohexanedione (1a) on DBU-catalyzed isomerization of compound 2 to compound 3 at various loadings of 1a relative to compound 2.

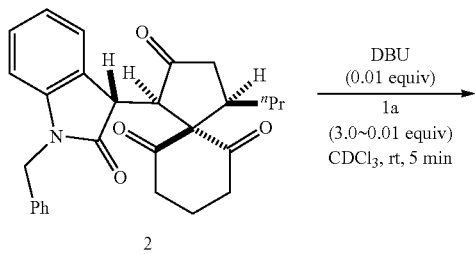

2

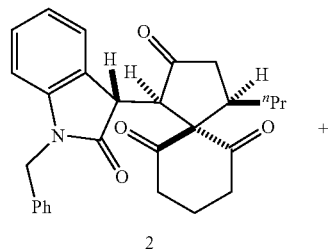

2 +

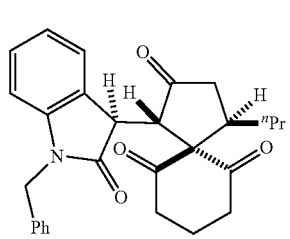

3

| entry | equivalents of 1a relative to 2 | concentration of 1a (M) | 2:3 at 5 min | enol form:keto form of 1a at 5 min |
|---|---|---|---|---|
| 1 | 3.0 | $8.6 \times 10^{-2}$ | >99.5:0.5 | 72:28 |
| 2 | 2.0 | $5.7 \times 10^{-2}$ | >99.5:0.5 | 50:60 |
| 3 | 1.0 | $2.8 \times 10^{-2}$ | >99.5:0.5 | 25:75 |
| 4 | 0.8 | $2.3 \times 10^{-2}$ | >99:1 | 18:82 |
| 5 | 0.5 | $1.4 \times 10^{-2}$ | >99:1 | 9:91 |
| 6 | 0.4 | $1.1 \times 10^{-2}$ | >99:1 | 6:94 |
| 7 | 0.3 | $8.6 \times 10^{-3}$ | >99:1 | 3:97 |
| 8 | 0.2 | $5.7 \times 10^{-3}$ | >99:1 | 1:99 |
| 9 | 0.1 | $2.8 \times 10^{-3}$ | >99:1 | not able to be determined |
| 10 | 0.05 | $1.4 \times 10^{-3}$ | 92:8 | not able to be determined |
| 11 | 0.01 | $2.8 \times 10^{-4}$ | 24:76 | not able to be determined |
| 12 | 0 | 0 | 24:76 | — |

TABLE 8

Effects of 1,3-cyclohexanedione (1a) on TfOH-catalyzed isomerization of compound 2 to compound 3 at various loadings of 1a relative to compound 2.

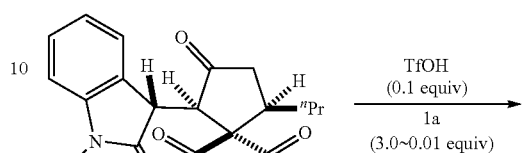

2

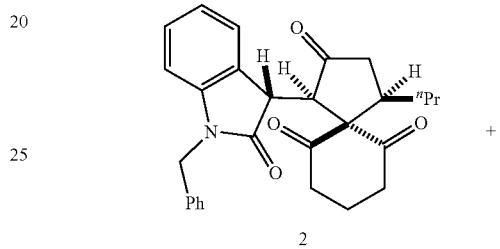

2 +

3

| entry | equivalents of 1a relative to 2 | concentration of 1a (M) | 2:3 at 1 h | enol form:keto form of 1a at 1 h |
|---|---|---|---|---|
| 1 | 3.0 | $8.6 \times 10^{-2}$ | >99.5:0.5 | 82:18 |
| 2 | 2.0 | $5.7 \times 10^{-2}$ | >99.5:0.5 | 56:44 |
| 3 | 1.0 | $2.8 \times 10^{-2}$ | >99.5:0.5 | 30:70 |
| 4 | 0.8 | $2.3 \times 10^{-2}$ | 99:1 | 23:77 |
| 5 | 0.5 | $1.4 \times 10^{-2}$ | 98:2 | 12:18 |
| 6 | 0.4 | $1.1 \times 10^{-2}$ | 84:16 | 9:91 |
| 7 | 0.3 | $8.6 \times 10^{-3}$ | 70:30 | 5:95 |
| 8 | 0.2 | $5.7 \times 10^{-3}$ | 59:41 | 1:99 |
| 9 | 0.1 | $2.8 \times 10^{-3}$ | 46:54 | not able to be determined |
| 10 | 0.05 | $1.4 \times 10^{-3}$ | 40:60 | not able to be determined |
| 11 | 0.01 | $2.8 \times 10^{-4}$ | 40:60 | not able to be determined |
| 12 | 0 | 0 | 29:71 | — |

Further, the buffering function of compound 1a was retained in the solution for more than 3 days, even at 60° C., in the presence of TfOH as shown in Table 9.

TABLE 9

Effects of 1,3-cyclohexanedione (1a) on TfOH-catalyzed isomerization of compound 2 to compound 3 at various time points.

[Reaction scheme: Compound 2 → Compound 2 + Compound 3, with TfOH (0.1 equiv), 1a (1.0 equiv), CDCl$_3$, 60° C.]

| entry | time (min) | 2:3 in the absence of 1a | 2:3 in the presence of 1a | enol form:keto form of 1a |
|---|---|---|---|---|
| 1 | 10 | 51:49 | >99.5:0.5 | 30:70 |
| 2 | 19 | 35:65 | >99.5:0.5 | 31:69 |
| 3 | 31 | 31:69 | >99.5:0.5 | 30:70 |
| 4 | 60 | 29:71 | >99.5:0.5 | 29:71 |
| 5 | 121 | 29:71 | >99.5:0.5 | 30:70 |
| 6 | 180 | 29:71 | >99.5:0.5 | 30:70 |
| 7 | 720 | 29:71 | >99.5:0.5 | 29:71 |
| 8 | 4320 | 29:71 | >99:1 | 29:71 |

Compound 1a has a buffering function over a wide range of conditions in non-aqueous solutions.

Example 2

Identification of Other Molecules That Show Buffering Functions in Non-Aqueous Solutions The effects of 1,3-cyclohexanedione derivatives and related molecules were then evaluated on the DBU-catalyzed and TfOH-catalyzed isomerization reactions of compound 2 to compound 3 (FIGS. 1 and 2). In the absence of 1,3-cyclohexanedione derivatives, the 2:3 ratio was 24:76 for the reaction with DBU and 29:71 for the reaction with TfOH (Table 1). 1,3-Cyclohexanedione derivatives 1b-1e completely inhibited the isomerization of compound 2, as did compound 1a, indicating that mono substitutions with methyl, benzyl, or phenyl groups at the 2-position of 1,3-cyclohexanedione and methyl substitutions at the 4- and 6-positions of 1,3-cyclohexanedione did not affect the buffering function (FIG. 1). In the presence of the 1,3-cyclohexanedione derivative bearing an isopropyl group at the 2-position (compound 10, the isomerization of compound 2 was less than 1%. The 1,3-cyclohexanedione derivatives with mono- or di-substitutions at the 5-position (compounds 1g-1i) also inhibited the isomerization to a similar extent to compound 1f. 1,3-Cyclohexanediones bearing cyclohexyl or triphenylmethyl groups, which are bulkier substituents than the isopropyl group, at the 2-position (compounds 1j and 1k, respectively) had a slightly reduced effect to inhibit the isomerization relative to compound 1f. 1,3-Cyclohexanedione conjugated to resin beads (resin-conjugated 1b) also inhibited the isomerization.

1,3-Cyclopentanedione (11) and 2-acetyl-1,3-cyclohexanedione (1m) also had some buffering function in the DBU-catalyzed and TfOH-catalyzed isomerization reactions of compound 2. On the other hand, 1,2-cyclohexanedione (1n), 1,4-cyclohexanedione (1o), and 2,2-dimethyl-1,3-cyclohexanedione (1p) did not have a buffering function to suppress the isomerization. Acyclic molecule 2,4-pentanedione (1q) also did not inhibit the isomerization.

These results indicate that compounds 1a-1e are the preferred buffering molecules of the compounds tested. Compounds 1f, 1j, and 1k may also be suitable for various applications that require buffering function. Similarly, resin bead-attached 1,3-cyclohexanedione (resin-conjugated compound 1b) may also be suitable for various uses to provide buffering functions.

The same test was conducted for compounds S1a through S1ee (FIG. 2). A solution of compound 2 (2:3>99.5:0.5, 1.0 equiv) and compounds S1a through S1ee (1.0 equiv) in CDCl$_3$ was stirred at room temperature (25° C.) for 5 min in the presence of DBU (0.01 equiv) or at 60° C. for 1 h in the presence of TfOH (0.1 equiv). The ratio 2:3 was determined by $^1$H NMR analysis at room temperature and is shown in the upper row for the reaction with DBU and in the lower row for the reaction with TfOH. S1k is a cis/trans mixture. Formation of cyclohexan-1,3-dione (for compounds S1o-S1w) or 2-methyl-1,3-cyclohexanedione (for compounds S1x and S1y) was observed (monitored by TLC) during the isomerization reaction of compound 2, and the ratio 2:3 was affected by the generated diones. Compound S1cc is identical to resin-conjugated 1b in FIG. 1. Molecules that are used as buffers in aqueous solutions, such as 2-[bis(2-hydroxy)amino]ethanesulfonic acid (BES), also did not inhibit the isomerization (FIG. 2).

Example 3

Effects of 1,3-cyclohexanedione Derivatives to Inhibit Acid- and Base-Catalyzed Isomerization and Decomposition Compounds 1 were then evaluated in isomerization and decomposition reactions of aldol products or β-hydroxyketones (FIG. 3, Scheme a, b). Aldol 4 is readily racemized under basic conditions (A. V. Malkov, M. K. Kabeshov, M. Bella, O. Kysllka, D. A. Malyshev, K. Pluhackova, P. Kocovsky, Org. Lett. 2007, 9, 5473; N. Duangdee, W. Harnying, G. Rulli, J.-M. Neudorfl, H. Groger, A. Berkessel, J. Am. Chem. Soc. 2012, 134, 11196), and the basic conditions also cause a retro-aldol reaction of aldol 4 to generate compound 5 (FIG. 3, Scheme a(i)). The addition of 2-methyl-1,3-cyclohexanedione (1b) to the solution of aldol 4 blocked the base-catalyzed racemization and the retro-aldol reaction of aldol 4 (FIG. 3, Scheme a(i)). This was tested at various time points (Table 10), with various compounds (Table 11), with various solvents (Table 12), with various amounts of compound 1b (Table 13).

TABLE 10

Effect of 2-methyl-1,3-cyclohexanedione (1b) on the DBU-catalyzed isomerization and decomposition of 4: Analyses at various time points.

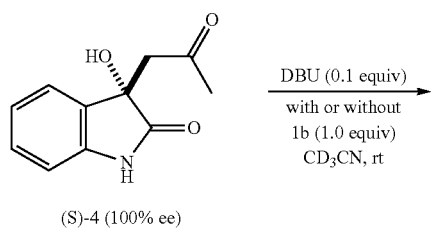

|  |  | in the absence of 1b | | in the presence of 1b | |
|---|---|---|---|---|---|
| entry | time (h) | 4:5 | ee % of 4 | 4:5 | ee % of 4 |
| 1 | 1 | 97:3 | 66 | 100:0 | 100 |
| 2 | 3 | 96:4 | 50 | 100:0 | 100 |
| 3 | 5 | 95:5 | 38 | 100:0 | 100 |
| 4 | 10 | 94:6 | 28 | 100:0 | 100 |
| 5 | 24 | 90:10 | 20 | 100:0 | 100 |
| 6 | 72 | 81:19 | 17 | 100:0 | >99.9 |

TABLE 11

Effect of compounds on the DBU-catalyzed isomerization and decomposition of 4.

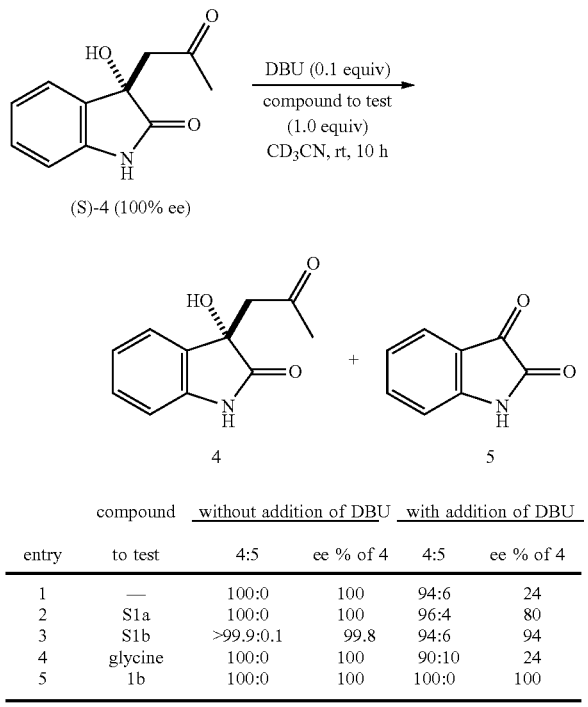

|  | compound | without addition of DBU | | with addition of DBU | |
|---|---|---|---|---|---|
| entry | to test | 4:5 | ee % of 4 | 4:5 | ee % of 4 |
| 1 | — | 100:0 | 100 | 94:6 | 24 |
| 2 | S1a | 100:0 | 100 | 96:4 | 80 |
| 3 | S1b | >99.9:0.1 | 99.8 | 94:6 | 94 |
| 4 | glycine | 100:0 | 100 | 90:10 | 24 |
| 5 | 1b | 100:0 | 100 | 100:0 | 100 |

TABLE 12

Effect of 2-methyl-1,3-cyclohexanedione (1b) on the DBU-catalyzed isomerization and decomposition of 4 in various solvents.

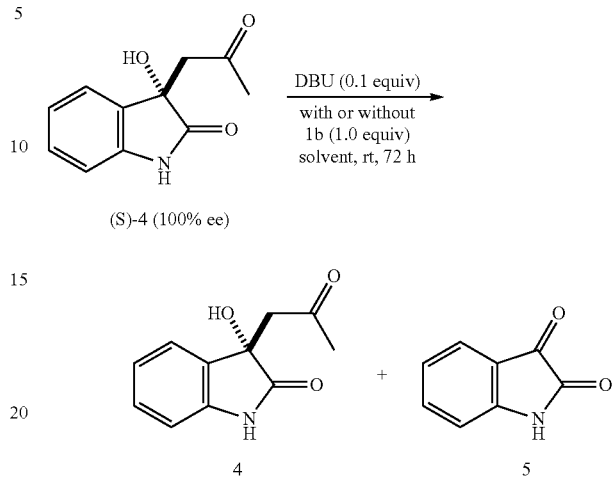

|  |  | in the absence of 1b | | in the presence of 1b | |
|---|---|---|---|---|---|
| entry | solvent | 4:5 | ee % of 4 | 4:5 | ee % of 4 |
| 1 | CDCl$_3$ | 90:10 | 30 | 100:0 | 99.4 |
| 2 | C$_6$D$_5$CD$_3$ | 91:9 | 35 | 100:0 | >99.9 |
| 3 | CD$_3$OD | 88:12 | 26 | 100:0 | >99.9 |

TABLE 13

Effects of 2-methyl-1,3-cyclohexanedione (1b) on DBU-catalyzed isomerization and decomposition of 4 at various loadings of 1b relative to 4.

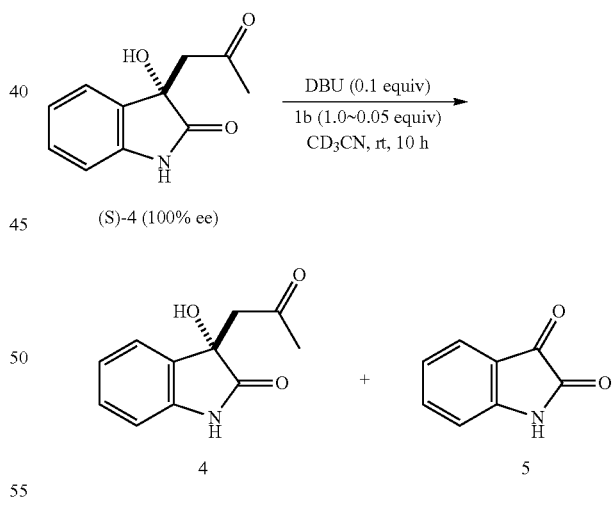

| entry | equivalents of 1b relative to 4 | 4:5 | ee % of 4 |
|---|---|---|---|
| 1 | 1.0 | 100:0 | 100 |
| 2 | 0.5 | 100:0 | 99.9 |
| 3 | 0.2 | 99.5:0.5 | 98.4 |
| 4 | 0.1 | 99:1 | 94 |
| 5 | 0.05 | 97:3 | 62 |
| 6 | 0 | 94:6 | 24 |

As described above, resin-supported 1b also completely inhibited the racemization and the decomposition. The addition of 2-pyridinecarboxylic acid, N,N-dimethylglycine, or glycine instead of compound 1a was unable to prevent the racemization (Table 11). Aldol 4 was also racemized under acidic conditions, and the acidic conditions caused the formation of elimination product 6 (L. J. Macpherson, A. E. Dubin, M. J. Evans, F. Man, P. G. Schultz, B. F. Cravatt, A. Patapoutian, Nature 2007, 445, 541) (FIG. 3, Scheme a(ii)). Compound 1b also prevented the acid-catalyzed racemization and the elimination reactions of aldol 4 (FIG. 3, Scheme a(ii)).

Similarly, 1,3-cyclohexanedione derivatives 1b and 1k also completely inhibited the racemization of β-hydroxyketone 7 and the decomposition of β-hydroxyketone 7 that generated compounds 8 and 9 (FIG. 3, Scheme b).

Isomerization of Mannich reaction product or amino aldehyde derivative 10 to 11 in the presence of DBU was also prevented by the addition of compound 1b (FIG. 3, Scheme c). Decomposition reactions of β-hydroxy-α-amino acid derivative or protected threonine derivative 12 by dehydration that resulted in the formation of compound 13 and by hydrolysis leading to the generation of benzyl alcohol were also inhibited by compound 1b (FIG. 3, Scheme d).

Example 4

Effects of 1,3-cyclohexanedione Derivatives to Alter and Control Chemical Transformations 2-methyl-1,3-cyclohexanedione (1b) was tested as to its function of altering the products of the chemical transformations (FIGS. 4, 5, and 6). For the protection of the hydroxy group of aldol 14, when aldol 14 was treated with TMSCN in the presence of DBU as a base at 60° C., products 15, 16, and 17 were obtained; selective formation of 15 in a high yield was not achieved without compound 1b (FIG. 4). When the same reaction was performed but with the addition of compound 1b, product 15 was obtained in a high yield, and the enantiopurity of the starting material was retained in the product (FIG. 4). In the absence of compound 1b, the cyanide anion generated from TMSCN reacted with aldol 14 to give products 16 and 17. In the presence of compound 1b, the cyanide anion may be protonated, preventing it from acting as a nucleophile.

In addition, compound 18 was used instead of compound 14 above. For a reaction of compound 18 in the absence of buffering molecule, to a solution of (±)-18 (100 mg, 0.286 mmol, 1.0 equiv) and TMSCN (53.8 µL, 0.43 mmol, 1.5 equiv) in CHCl₃ (1.0 mL), DBU (4.3 µL, 0.029 mmol, 0.1 equiv) was added at room temperature (25° C.), and the mixture was stirred at 60° C. for 1 h. After being cooled to room temperature, the mixture was purified by flash column chromatography (hexane/EtOAc=5:1) to afford compound 35 (32.5 mg, 27%), compound 36 (44.7 mg, 30%, dr=1:1), and compound 37 (51.6 mg, 40%). For a reaction of compound 18 in the presence of compound 1b, to a mixture of (R)-18 (100 mg, 0.286 mmol, 1.0 equiv), TMSCN (53.8 µL, 0.43 mmol, 1.5 equiv), and compound 1b (36.2 mg, 0.286 mmol, 1.0 equiv) in CHCl₃ (1.0 mL), DBU (4.3 µL, 0.029 mmol, 0.1 equiv) was added at room temperature (25° C.), and the mixture was stirred at 60° C. for 1.5 h. After being cooled to room temperature, the reaction mixture was purified by flash column chromatography (hexane/EtOAc=5:1) to afford compound 35 (118.2 mg, 98%, 96% ee).

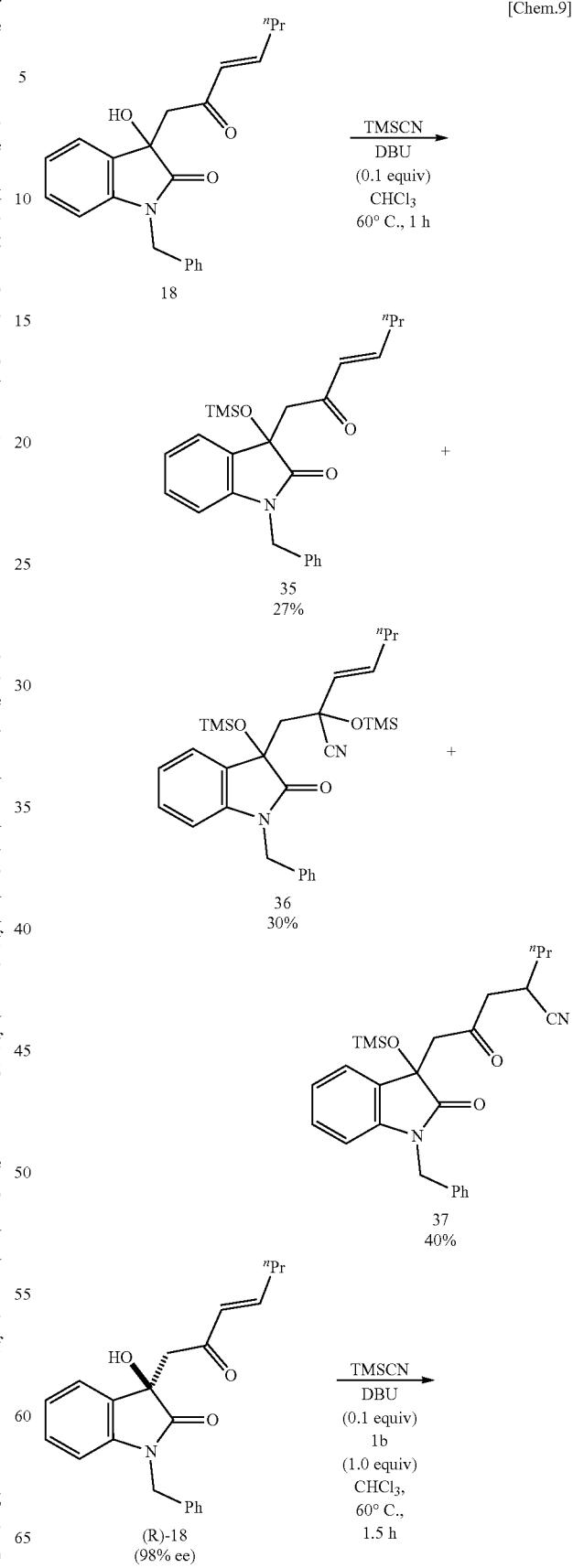

[Chem.9]

-continued

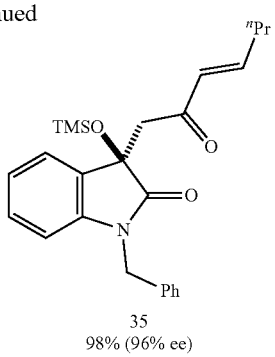

35
98% (96% ee)

The reaction of β-hydroxyenone derivative 18 with furan was also altered by the addition of compound 1b (FIG. 5, Scheme a). Under acidic conditions, compound 18 was readily converted to oxa-Michael cyclization product 19 without compound 1b. Neat conditions for the reaction of compound 18 with furan using TfOH as catalyst and without compound 1b resulted in the formation of a complex mixture containing more than six new spots on TLC analysis; none of them were products 20 or 21. In contrast, the reaction under the same neat conditions but in the presence of compound 1b afforded furan-added products 20 (keto form) and 21 (enol form) (FIG. 5, Scheme a). Similarly, TfOH-catalyzed reactions of β-hydroxyenone derivative 22 with furan in the presence of compound 1b afforded corresponding addition products 23 and 24 (FIG. 5, Scheme b), and the reaction of aldol 14 under these conditions yielded product 25 (FIG. 5, Scheme c). The TfOH-catalyzed reactions of β-hydroxyenone derivative 18 with thiophene or benzofuran in the presence of compound 1b afforded corresponding addition products 26 and 27, respectively (FIG. 5, Scheme d).

In addition, as a control reaction, a reaction of compound 38 with furan in the presence of compound 1b was conducted. Specifically, to a solution of compound 38 (47.4 mg, 0.143 mmol, 1.0 equiv) and compound 1b (18.1 mg, 0.143 mmol, 1.0 equiv) in furan (0.5 mL, 6.9 mmol, 48 equiv), TfOH (1.3 μL, 0.014 mmol, 0.1 equiv) was added at room temperature (25° C.), and the mixture was stirred at 60° C. The reaction mixture was analyzed by TLC and $^1$H NMR, which indicated that 38 was unchanged (i.e., no reaction) for 12 h as shown below:

[Chem.10]

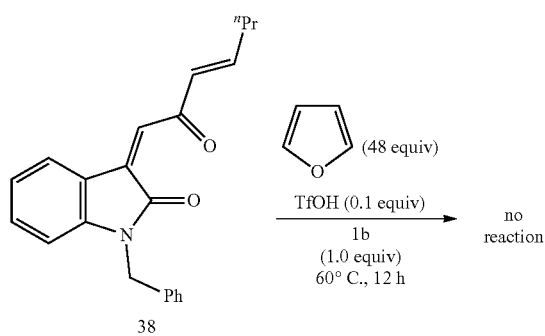

Further, the use of the buffering function of compound 1b allowed the synthesis of complex spirooxindole derivatives (FIG. 6). Spirooxindoles bearing fused ring systems are of interest for the development of pharmaceuticals and related molecules (J.-R. Huang, M. Sohail, T. Taniguchi, K. Monde, F. Tanaka, Angew. Chem. Int. Ed. 2017, 56, 5853; Angew. Chem. 2017, 129, 5947; M. Sohail, F. Tanaka, Communications Chem. 2019, 2, 73, doi: 10.1038/s42004-019-0177-5; D. Enders, Angew. Chem. Int. Ed. 2017, 56, 8516; Angew. Chem. 2017, 129, 8636; Z. Zhou, Z.-X. Wang, Y.-C. Zhou, W. Xiao, Q. Ouyang, W. Du, Y.-C. Chen, Nat. Chem. 2017, 9, 590; K. Jiang, Z.-J. Jia, X. Yin, L. Wu, Y.-C. Chen, Org. Lett. 2010, 12, 2766; L.-L. Zhang, J.-W. Zhang, S.-H. Xiang, Z. Guo, B. Tan, Org. Lett. 2018, 20, 6022). Concise construction of functionalized fused ring systems is a challenge, however (B. M. Bocknack, L.-C. Wang, M. J. Krische, Proc. Natl. Acad. Sci. USA, 2004, 101, 5421). Under acidic conditions with TfOH, compound 18 was transformed to oxa-cyclization product 19 without compound 1b (FIG. 6, Scheme a). The same reaction but with the addition of compound 1b led to the dimerization of compound 18, resulting in the formation of spirooxindole octahydropentalene derivative 28 (FIG. 6, Scheme a). The relative stereochemistry of compound 28 was determined by X-ray crystal structural analysis. Treatment of spirooxindole tetrahydropyran 19 under the conditions used for the formation of compound 28 (i.e., with TfOH and compound 1b) did not form compound 28. The treatment of compound 18 with compound 1b alone without TfOH did not lead to the formation of compound 19 or 28. Milder acids such as acetic acid and trifluoroacetic acid also did not catalyze the formation of compound 28 from compound 18. These results suggest that the use of compound 1b in the TfOH-catalyzed reaction tunes the reaction conditions for the formation of compound 28 or that compound 1b makes the TfOH-catalyzed reaction environment less acidic allowing the formation of the enolate from 18, which is necessary for the C—C bond formation that leads to the formation of compound 28. Similarly, the TfOH-catalyzed reactions of compounds 29-31 in the presence of compound 1b afforded compounds 32-34, respectively (FIG. 6, Scheme b). The buffering function of compound 1b enabled the synthesis of complex spirooxindole octahydropentalenes.

The invention claimed is:

1. In a method of buffering a non-aqueous solution comprising an organic solvent comprising adding a buffering molecule, the improvement wherein said buffering molecule is a compound presented by Formula I:

[Chem. 1]

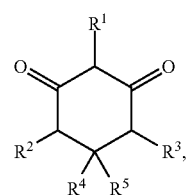

wherein $R^1$ to $R^5$ each are hydrogen oralkyl, cycloalkyl, aryl, heterocycloalkyl, heteroaryl, or acyl, which is optionally substituted with one or more substituents selected from the group consisting of alkyl, alkenyl, alkynyl, alkoxy, nitro, cyano, halogen, hydroxy, acyl, carboxyl, carboxyamide, carboxylic acid ester, haloalkyl, halo-alkoxy, aryl, heterocycloalkyl, and heteroaryl, or Formula II:

[Chem. 2]

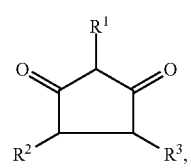

wherein $R^1$ to $R^3$ each are hydrogen or alkyl, cycloalkyl, aryl, heterocycloalkyl, heteroaryl, or acyl, which is optionally substituted with one or more substituents selected from the group consisting of alkyl, alkenyl, alkynyl, alkoxy, nitro, cyano, halogen, hydroxy, acyl, carboxyl, carboxyamide, carboxylic acid ester, haloalkyl, halo-alkoxy, aryl, heterocycloalkyl, and heteroaryl.

2. A method for controlling structural change of a compound in a non-aqueous solution, wherein an acid or a base is capable of causing structural change of the compound, and the method comprises preparing a non-aqueous solution comprising the compound and a buffering molecule represented by Formula I:

[Chem. 3]

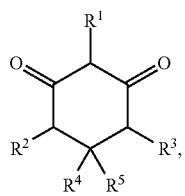

wherein $R^1$ to $R^5$ each are hydrogen alkyl, cycloalkyl, aryl, heterocycloalkyl, heteroaryl, or acyl, which is optionally substituted with one or more substituents selected from the group consisting of alkyl, alkenyl, alkynyl, alkoxy, nitro, cyano, halogen, hydroxy, acyl, carboxyl, carboxyamide, carboxylic acid ester, haloalkyl, halo-alkoxy, aryl, heterocycloalkyl, and heteroaryl, or Formula II:

[Chem. 4]

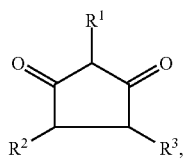

wherein $R^1$ to $R^3$ each are hydrogen or alkyl, cycloalkyl, aryl, heterocycloalkyl, heteroaryl, or acyl, which is optionally substituted with one or more substituents selected from the group consisting of alkyl, alkenyl, alkynyl, alkoxy, nitro, cyano, halogen, hydroxy, acyl, carboxyl, carboxyamide, carboxylic acid ester, haloalkyl, halo-alkoxy, aryl, heterocycloalkyl, and heteroaryl.

3. The method according to claim 2, wherein the method is for suppressing the structural change of the compound in the non-aqueous solution.

4. The method according to claim 3, wherein an acid or a base is capable of causing isomerization of the compound, and the method is for suppressing the isomerization of the compound in the non-aqueous solution.

5. The method according to claim 3, wherein an acid or a base is capable of causing decomposition of the compound, and the method is for suppressing the decomposition of the compound in the non-aqueous solution.

6. The method according to claim 2, wherein the structural change is for converting the compound to a product having another structure.

7. The method according to claim 6, wherein the product is produced by reacting two or more molecules of the compound with each other.

8. A non-aqueous solution comprising:
a compound in which an acid or a base is capable of causing structural change of the compound, and
a buffering molecule represented by Formula I:

[Chem. 5]

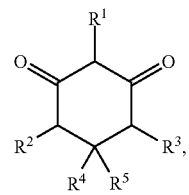

wherein $R^1$ to $R^5$ each are hydrogen or alkyl, cycloalkyl, aryl, heterocycloalkyl, heteroaryl, or acyl, which is optionally substituted with one or more substituents selected from the group consisting of alkyl, alkenyl, alkynyl, alkoxy, nitro, cyano, halogen, hydroxy, acyl, carboxyl, carboxyamide, carboxylic acid ester, haloalkyl, halo-alkoxy, aryl, heterocycloalkyl, and heteroaryl, or Formula II:

[Chem. 6]

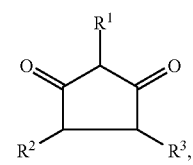

wherein $R^1$ to $R^3$ each are hydrogen or alkyl, cycloalkyl, aryl, heterocycloalkyl, heteroaryl, or acyl, which is optionally substituted with one or more substituents selected from the group consisting of alkyl, alkenyl, alkynyl, alkoxy, nitro, cyano, halogen, hydroxy, acyl, carboxyl, carboxyamide, carboxylic acid ester, haloalkyl, halo-alkoxy, aryl, heterocycloalkyl, and heteroaryl.

9. An article comprising:
a solid support, wherein the solid support is a resin; and
a buffering molecule conjugated to the solid support and represented by Formula I:

[Chem. 7]

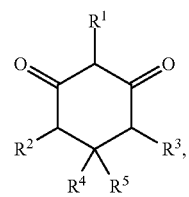

wherein $R^1$ to $R^5$ each are hydrogen or alkyl, cycloalkyl, aryl, heterocycloalkyl, heteroaryl, or acyl, which is optionally substituted with one or more substituents selected from the group consisting of alkyl, alkenyl, alkynyl, alkoxy, nitro, cyano, halogen, hydroxy, acyl, carboxyl, carboxyamide, carboxylic acid ester, haloalkyl, halo-alkoxy, aryl, heterocycloalkyl, and heteroaryl, and one of $R^1$ to $R^5$ is conjugated to the solid support, or Formula II:

[Chem. 8]

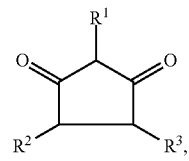

wherein $R^1$ to $R^3$ each are hydrogen or alkyl, cycloalkyl, aryl, heterocycloalkyl, heteroaryl, or acyl, which is optionally substituted with one or more substituents selected from the group consisting of alkyl, alkenyl, alkynyl, alkoxy, nitro, cyano, halogen, hydroxy, acyl, carboxyl, carboxyamide, carboxylic acid ester, haloalkyl, halo-alkoxy,
  aryl, heterocycloalkyl, and heteroaryl, and one of $R^1$ to $R^3$ is conjugated to the solid support.

10. The method according to claim 1, wherein the compound represented by Formula I is conjugated to a solid support and the compound represented by Formula II is conjugated to a solid support, wherein said solid support is a resin.

* * * * *